US009366835B2

(12) United States Patent
Masuyama et al.

(10) Patent No.: US 9,366,835 B2
(45) Date of Patent: Jun. 14, 2016

(54) INTEGRATED OPTICAL SEMICONDUCTOR DEVICE AND INTEGRATED OPTICAL SEMICONDUCTOR DEVICE ASSEMBLY

(71) Applicant: SUMITOMO ELECTRIC INDUSTRIES, LTD., Osaka (JP)

(72) Inventors: Ryuji Masuyama, Kamakura (JP); Yoshihiro Yoneda, Isehara (JP); Hideki Yagi, Machida (JP); Naoko Konishi, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/643,951

(22) Filed: Mar. 10, 2015

(65) Prior Publication Data
US 2015/0260933 A1 Sep. 17, 2015

(30) Foreign Application Priority Data
Mar. 11, 2014 (JP) ................................ 2014-047643

(51) Int. Cl.
*G02B 6/12* (2006.01)
*G02B 6/42* (2006.01)
*G02B 6/122* (2006.01)

(52) U.S. Cl.
CPC ............. *G02B 6/4274* (2013.01); *G02B 6/122* (2013.01); *G02B 6/4204* (2013.01); *G02B 6/428* (2013.01); *G02B 6/4295* (2013.01)

(58) Field of Classification Search
None
See application file for complete search history.

(56) References Cited

U.S. PATENT DOCUMENTS

| 2003/0108294 | A1* | 6/2003 | Zheng | G02B 6/12004 385/39 |
| 2011/0064360 | A1* | 3/2011 | Jeong | G02B 6/125 385/39 |
| 2012/0106984 | A1* | 5/2012 | Jones | H04L 27/223 398/214 |
| 2013/0330038 | A1* | 12/2013 | Onishi | G02B 6/262 385/31 |
| 2015/0286005 | A1* | 10/2015 | Dumais | G02B 6/29344 385/16 |

FOREIGN PATENT DOCUMENTS

JP 2013-005014 1/2013

\* cited by examiner

*Primary Examiner* — Hemang Sanghavi
(74) *Attorney, Agent, or Firm* — Smith, Gambrell & Russell, LLP.

(57) ABSTRACT

An integrated optical semiconductor device includes a substrate including first and second regions; a plurality of light receiving devices disposed in the second region; a multimode interference coupler disposed in the first region, the multimode interference coupler including output optical waveguides optically coupled to the corresponding light receiving devices; first and second conductive layers disposed on a back surface of the substrate in the first and second regions, respectively; and a plurality of capacitors disposed in the second region, each of the capacitors including a first electrode connected to one of the light receiving devices and a second electrode connected to the second conductive layer. The second conductive layer is electrically insulated from the first conductive layer. The substrate is made of a semi-insulating semiconductor. The multimode interference coupler and the light receiving devices include the same n-type semiconductor layer disposed on a principal surface of the substrate.

10 Claims, 16 Drawing Sheets

FIG. 9A
FIG. 9B
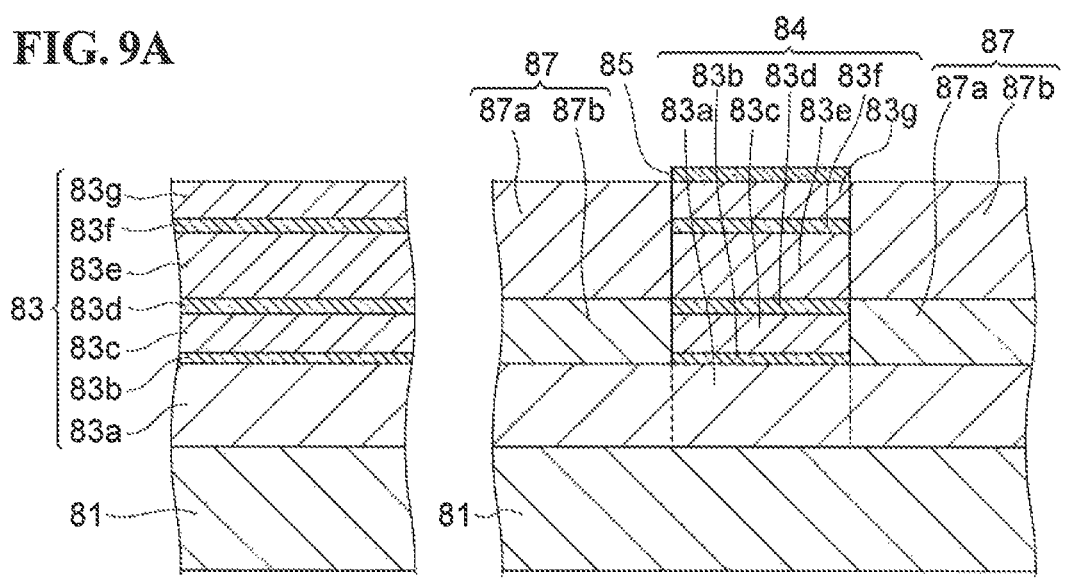
FIG. 9C
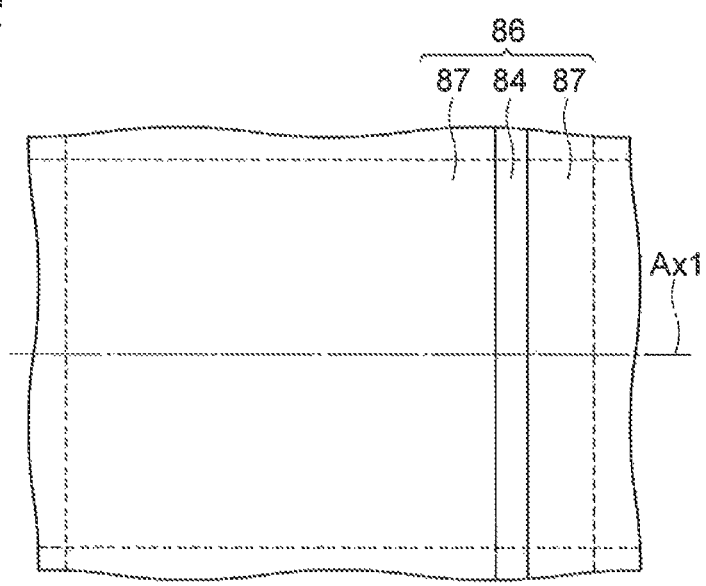

INTEGRATED OPTICAL SEMICONDUCTOR DEVICE AND INTEGRATED OPTICAL SEMICONDUCTOR DEVICE ASSEMBLY

BACKGROUND OF THE INVENTION

1. Field of the Invention

The present invention relates to an integrated optical semiconductor device and an integrated optical semiconductor device assembly.

2. Description of the Related Art

An optical receiving circuit is disclosed in Japanese Unexamined Patent Application Publication No. 2013-5014. The optical receiving circuit includes a transimpedance amplifier (TIA) chip connected to a light receiving device and a ground pad disposed on the upper surface of the TIA chip. This ground pad is connected to another ground pad disposed on the upper surface of a PD submount through a bonding wire.

In recent years, the light receiving device used for optical communication is monolithically integrated with an optical processing device on a semi-insulating InP substrate. For example, the optical processing device includes a multimode interference (MMI) coupler. This multimode interference coupler converts a phase difference of a phase-modulated external optical signal to optical intensity and generates a plurality of optical signals related to a signal symbol. The light receiving device receives optical signals from the optical processing device and generates electric signals converted from the individual optical signals. The light receiving device (photodiode) includes a stacked semiconductor layer structure including an n-type semiconductor layer, a p-type semiconductor layer, and a non-doped optical absorption layer disposed between the n-type and p-type semiconductor layers. The stacked semiconductor layer structure includes a p-n junction. In addition, the light receiving device operates under applying a voltage through the p-n junction to generate the electric signals. On the other hand, the multimode interference coupler includes a stacked semiconductor layer structure constituting an optical waveguide to propagate optical signals. The multimode interference coupler is a so-called passive device that operates without applying a voltage. Both photodiode and multimode interference coupler are monolithically integrated on a semi-insulating semiconductor substrate.

SUMMARY OF THE INVENTION

However, the stacked semiconductor layer structure constituting the photodiode has a structure different from the structure of the stacked semiconductor layer structure constituting the multimode interference (MMI) coupler. In order to optically couple stacked semiconductor layer structures that have a different structure from each other, a butt-joint structure is adopted. That is, the different stacked semiconductor layer structures are connected in direct contact with each other by using the butt joint structure. For forming the different stacked semiconductor layer structures connected by the butt joint structure, two steps of the epitaxial growth process are performed. In the epitaxial growth process, the two stacked semiconductor layer structures are aligned in the thickness direction to optically couple stacked semiconductor layer structures. Specifically, a core layer including in one of the stacked semiconductor layer structures is aligned with a core layer including in the other stacked semiconductor layer structures by precisely controlling the thicknesses of the semiconductor layers formed under the core layers with precision of nm. Therefore, it is very difficult to form a butt joint structure exhibiting good optical coupling. By reducing the thickness of the semiconductor layer, the controllability of the thickness of the semiconductor layer can be improved. However, the semiconductor layers included in each stacked semiconductor layer structure are designed to have a thickness to obtain a function for the MMI coupler or the photodiode. Therefore, the thicknesses of the semiconductor layers cannot be changed independently without considering the function of the MMI coupler or the photodiode. In order to reduce the thicknesses of the semiconductor layers while maintaining the function of the MMI coupler or the photodiode, an integrated optical semiconductor device having a structure in which the n-type or p-type semiconductor layer disposed under the core layer of the photodiode is also used as the semiconductor layer disposed under the core layer of the MMI coupler was experimentally fabricated.

The reduction in the thickness of the semiconductor layer is also effective in reducing a processing load in the epitaxial growth process. In a method for producing an integrated optical semiconductor device, the plurality of growth processes is needed. Therefore, it is important to reduce the processing load in the epitaxial growth process in the fabrication method of the integrated optical semiconductor device.

Furthermore, another integrated optical semiconductor device having a following structure was also experimentally fabricated. That is, in the integrated optical semiconductor device, a plurality of capacitors having a metal-insulator-metal (MIM) structure was integrated with a plurality of photodiodes on a single substrate such as a semi-insulating semiconductor substrate. One electrode of each capacitor was connected to a bias electrode of one of the plurality of photodiodes to obtain good light receiving characteristics. Another electrode of the capacitor was connected to a back surface electrode formed on a back surface of the semi-insulating semiconductor substrate through a through-via in the semi-insulating semiconductor substrate. The back surface electrode serves as a ground electrode. It was found that good light receiving characteristics and a stable operation of the photodiode are achieved for the integrated optical semiconductor device having the above structures.

However, in the above-described integrated optical semiconductor device, an unexpected current was observed between a pad electrode for signal output of the photodiode and the back surface electrode. The behavior of this current had similarities to electrical characteristics of the photodiode having a large dark current.

An integrated optical semiconductor device according to an aspect of the present invention includes (a) a substrate having a principal surface and a back surface opposite to the principal surface, the substrate including a first region and a second region arranged in a first axis direction; (b) a plurality of light receiving devices disposed on the principal surface in the second region of the substrate, the light receiving device including a low cladding layer including an n-type semiconductor layer and a light receiving layer disposed on the low cladding layer; (c) a multimode interference coupler disposed on the principal surface in the first region of the substrate, the multimode interference coupler including a first cladding layer and a core layer disposed on the first cladding layer, the multimode interference coupler including output optical waveguides that are optically coupled to the corresponding light receiving devices; (d) a first conductive layer disposed on the back surface in the first region of the substrate; (e) a second conductive layer disposed on the back surface in the second region of the substrate, the second conductive layer being electrically insulated from the first conductive layer by a gap between the first and second conductive layers; and (f)

a plurality of capacitors disposed on the principal surface in the second region of the substrate, each of the capacitors including a first electrode electrically connected to one of the light receiving devices and a second electrode electrically connected to the second conductive layer. The substrate is made of a semi-insulating semiconductor. In addition, the first cladding layer of the multimode interference coupler includes the n-type semiconductor layer of the light receiving device.

BRIEF DESCRIPTION OF THE DRAWINGS

FIGS. 9A, 9B, and 9C are drawings schematically showing main steps in a method for producing an integrated optical semiconductor device.

DESCRIPTION OF THE PREFERRED EMBODIMENTS

Figure 1:
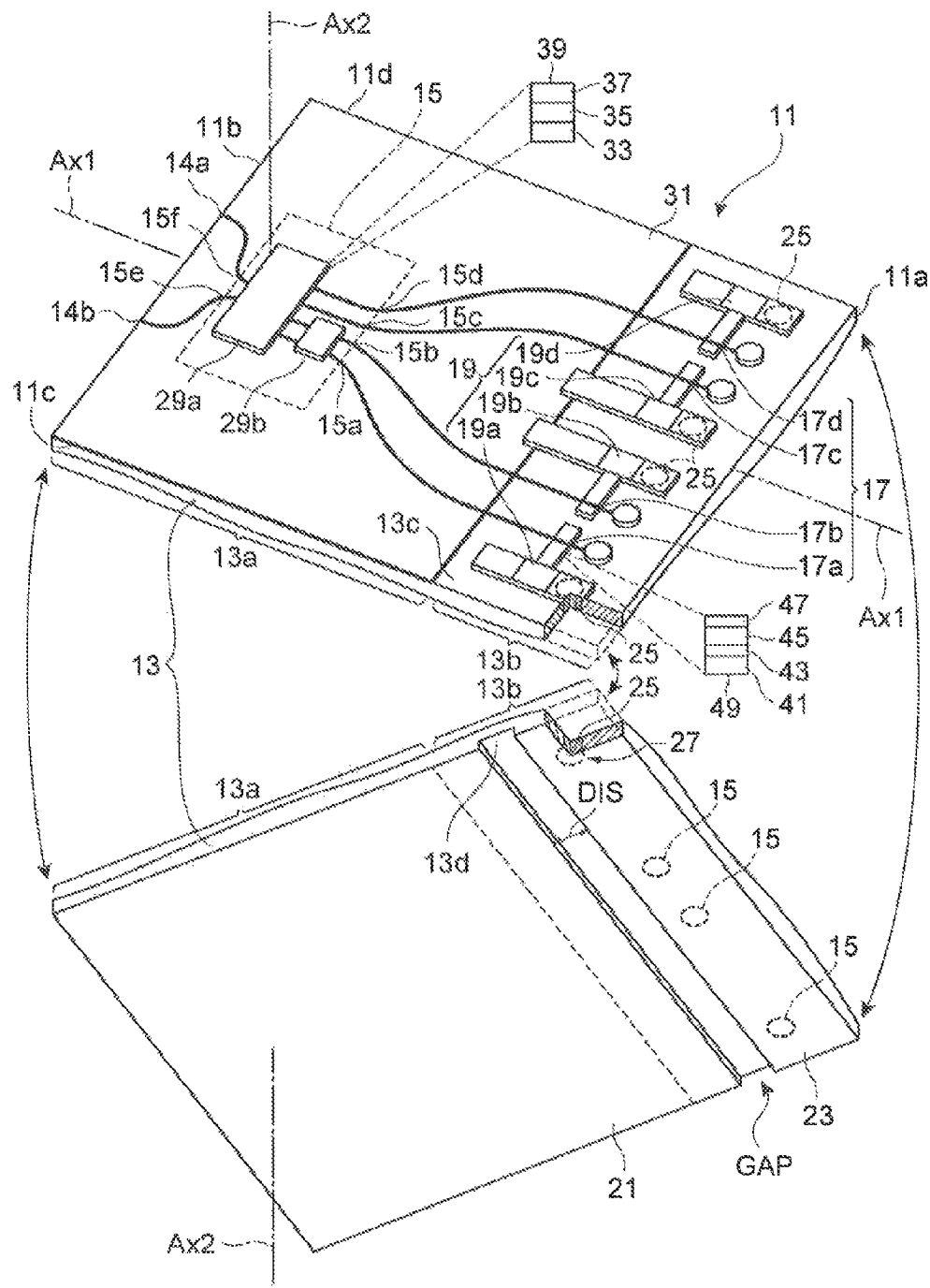
FIG. 1 is a diagram schematically showing an integrated optical semiconductor device according to the present embodiment.

Some embodiments according to the present invention will be described below.

An integrated optical semiconductor device according to an aspect of the present invention includes (a) a substrate having a principal surface and a back surface opposite to the principal surface, the substrate including a first region and a second region arranged in a first axis direction; (b) a plurality of light receiving devices disposed on the principal surface in the second region of the substrate, the light receiving device including a low cladding layer including an n-type semiconductor layer and a light receiving layer disposed on the low cladding layer; (c) a multimode interference coupler disposed on the principal surface in the first region of the substrate, the multimode interference coupler including a first cladding layer and a core layer disposed on the first cladding layer, the multimode interference coupler including output optical waveguides that are optically coupled to the corresponding light receiving devices; (d) a first conductive layer disposed on the back surface in the first region of the substrate; (e) a second conductive layer disposed on the back surface in the second region of the substrate, the second conductive layer being electrically insulated from the first conductive layer by a gap between the first and second conductive layers; and (f) a plurality of capacitors disposed on the principal surface in the second region of the substrate, each of the capacitors including a first electrode electrically connected to one of the light receiving devices and a second electrode electrically connected to the second conductive layer. The substrate is made of a semi-insulating semiconductor material. In addition, the first cladding layer of the multimode interference coupler includes the n-type semiconductor layer of the light receiving device.

According to this integrated optical semiconductor device, a plurality of light receiving device and the multimode interference (MMI) coupler optically coupled to the light receiving device are integrated on the principal surface of the substrate made of a semi-insulating semiconductor material (hereinafter, referred to as "semi-insulating semiconductor substrate"). The light receiving device includes the low cladding layer including the n-type semiconductor layer and the light receiving layer disposed on the low cladding layer. The multimode interference coupler includes the first cladding layer and the core layer disposed on the first cladding layer. The first cladding layer of the multimode interference coupler includes the n-type semiconductor layer of the light receiving device. On the other hand, the first conductive layer and the second conductive layer are disposed on the back surface in the first and second region of the substrate, respectively. Therefore, the semi-insulating semiconductor substrate is located between the n-type semiconductor layer and the first conductive layer in the first region in which the multimode interference coupler is disposed. The semi-insulating semiconductor substrate has a relatively large electric resistance. Therefore, the semi-insulating semiconductor substrate is used for semiconductor devices required to exhibit good high-frequency characteristics.

However, it is experimentally found that a small amount of leakage current passes through the semi-insulating semiconductor substrate between the n-type semiconductor layer and the first conductive layer, even when the semi-insulating semiconductor substrate has a large electric resistance (hereafter, this leakage current is referred to as "substrate leakage current"). In the integrated optical semiconductor device in which a plurality of semiconductor devices is integrated on a single substrate, the size of the substrate becomes remarkably large. Specifically, the multimode interference coupler disposed in the first region of the substrate has a larger area as compared with the area of the light receiving device disposed in the second region of the substrate. Because of the large area of the n-type semiconductor layer disposed on the principal surface in the first region of the substrate, the substrate leakage current increases up to the magnitude at the level of a dark current of the photodiode or a large value more than this.

This substrate leakage current depends on the size of the semi-insulating semiconductor substrate and the resistivity of the semi-insulating semiconductor substrate. The size of the semi-insulating semiconductor substrate is specified by areas occupied by devices integrated in the integrated optical semiconductor device. The resistivity of the semi-insulating semiconductor substrate is specified by the concentration of iron (Fe) impurity in the semi-insulating semiconductor substrate. The size and the resistivity of the semi-insulating semiconductor substrate are limited to the predetermined values to obtain desired characteristics. Therefore, both of them are not able to be specified freely, in the embodiment, the first conductive layer and the second conductive layer are disposed on the back surface in the first region and the second region of the semi-insulating semiconductor substrate, respectively. When the first conductive layer and the second conductive layer are connected to each other without isolation, a small amount of substrate leakage current mainly flows between the n-type semiconductor layer and the first conductive layer having a larger area through the semi-insulating semiconductor substrate even if the semi-insulating semiconductor substrate has a large resistivity. However, in the integrated optical semiconductor device according to the embodiment, the second conductive layer is placed in isolation from the first conductive layer. Therefore, the substrate leakage current does not flow between the n-type semiconductor layer and the first conductive layer when the bias voltage is applied between the cathode electrode of the light receiving device and the second conductive layer that is connected to ground level. In addition, the second conductive layer has a small area. Therefore, substrate leakage current flowing between the n-type semiconductor layer and the second conductive layer through the semi-insulating semiconductor substrate is reduced.

In the integrated optical semiconductor device according to an embodiment, preferably, the first conductive layer and the second conductive layer each include a seed conductive layer disposed on the back surface of the substrate and a gold plating layer disposed on the seed conductive layer. The seed conductive layer may include a platinum layer disposed on the back surface of the substrate and a gold layer disposed on the platinum layer.

The integrated optical semiconductor device according to an embodiment may further include a plurality of through-holes disposed in the second region of the substrate, the through-hole including a conductive material therein. Each of the second electrodes of the capacitors may be electrically connected to the second conductive layer through the conductive material of at least one of the through-holes. In addition, the seed conductive layer of the second conductive layer may be further disposed on a side surface of the through-hole. The through-hole may be filled with the gold plating layer. The conductive material may be composed of the seed conductive layer and the gold plating layer.

In the integrated optical semiconductor device according to an embodiment, preferably, the plurality of light receiving devices is arranged along a direction intersecting the first axis direction. The capacitors having the first electrodes connected to the corresponding light receiving devices are preferably arranged along the direction intersecting the first axis direction.

In the integrated optical semiconductor device according to an embodiment, preferably, the second conductive layer is electrically insulated from the first conductive layer by a groove in the gap between the first and second conductive layers. The groove may have a bottom reaching a midpoint of the substrate. According to the integrated optical semiconductor device, the first conductive layer is isolated from the second conductive layer by the gap formed from the groove reaching the semi-insulating semiconductor substrate. Therefore, the first conductive layer is reliably electrically insulated from the second conductive layer. As a result, the substrate leakage current is further reduced.

In the integrated optical semiconductor device according to an embodiment, preferably, each of the output optical waveguides of the multimode interference coupler is connected in contact with the light receiving device at a butt-jointed portion on a boundary between the output optical waveguide and the light receiving device.

In the integrated optical semiconductor device according to an embodiment, preferably, the n-type semiconductor layer included in the multimode interference coupler is disposed on the entire principal surface in the first region of the substrate. The substrate is disposed between the n-type semiconductor layer and the first conductive layer in the first region.

An integrated optical semiconductor device assembly according to another aspect of the present invention includes the integrated optical semiconductor device according to the above-described embodiment and a circuit board on which the integrated optical semiconductor device is mounted, the circuit board having a first electrode layer and a second electrode layer electrically insulated from the first electrode layer. The first conductive layer of the integrated optical semiconductor device is mounted in contact with the first electrode layer of the circuit board. The second conductive layer of the integrated optical semiconductor device is mounted in contact with the second electrode layer of the circuit board. The second electrode layer of the circuit board is connected to ground level. In addition, the first electrode layer is electrically floating.

According to this integrated optical semiconductor device assembly, the first conductive layer and the second conductive layer of the integrated optical semiconductor device are electrically insulated from each other when the integrated optical semiconductor device is mounted on the circuit board. The second electrode layer of the circuit board connected to the second conductive layer is connected to ground level. On the other hand, the first electrode layer of the circuit board connected to the first conductive layer is electrically floating. Therefore, the substrate leakage current which flows into the second conductive layer is reduced when the bias voltage is applied between the cathode electrode of the light receiving device and the second conductive layer that is connected to ground level through the second electrode layer of the circuit board.

The findings of the present invention will be understood easily in consideration of the following detailed description with reference to the attached drawings shown as examples. The embodiments related to the integrated optical semiconductor device, a method for manufacturing the integrated optical semiconductor device, an optical receiver including the integrated optical semiconductor device, and a method for manufacturing the optical receiver will be described below with reference to the attached drawings. The same portions are indicated by the same reference numerals, where possible.

FIG. 1 is a diagram schematically showing the integrated optical semiconductor device according to the present embodiment. In FIG. 1, the integrated optical semiconductor device is drawn in such a way that both surfaces thereof are shown.

An integrated optical semiconductor device 11 includes a semi-insulating semiconductor substrate 13, a multimode interference (MMI) coupler 15, a light receiving device 17, a capacitor 19, a first conductive layer 21, a second conductive layer 23, and a conductive material 25. The semi-insulating semiconductor substrate 13 has a first region 13a and a second region 13b. The first region 13a and the second region 13b are arranged in the direction of a first axis Ax1. The semi-insulating semiconductor substrate 13 has a principal surface and a back surface opposite to the principal surface. The semi-insulating semiconductor substrate 13 has a first surface 13c and a second surface 13d. In the embodiment, the first surface 13c is the principal surface of the semi-insulating semiconductor substrate 13. The second surface 13d is the back surface of the semi-insulating semiconductor substrate 13. The first surface 13c and the second surface 13d extend along a first reference plane and a second reference plane, respectively, orthogonal to a second axis Ax2 intersecting the first axis Ax1. The first surface 13c is located on the side opposite to the second surface 13d.

The first conductive layer 21 is disposed on the second surface 13d in the first region 13a of the semi-insulating semiconductor substrate 13. The second conductive layer 23 is disposed on the second surface 13d in the second region 13b of the semi-insulating semiconductor substrate 13. An isolation groove (GAP) is formed between the first conductive layer 21 and the second conductive layer 23. The first conductive layer 21 and the second conductive layer 23 are placed in isolation from each other. Therefore, one of the first conductive layer 21 and the second conductive layer 23 is placed at a distance DIS from the other. In the embodiment, the first region 13a has a device area larger than the area of the second region 13b. In the first region 13a, the multimode interference coupler 15 is disposed. In the second region 13b, the light receiving device 17, the capacitor 19, and through-vias (conductive materials 25 and through-holes 27) are disposed. Similarly, the first conductive layer 21 has a larger area than that of the second conductive layer 23. The semi-insulating semiconductor substrate 13 has resistivity of $1 \times 10^7$ Ωcm or more. For example, the semi-insulating semiconductor substrate 13 is made of a semi-insulating semiconductor material such as Fe-doped InP. The Fe-doped InP substrate has, for example, an iron (Fe) concentration of $1 \times 10^{15}$ cm$^{-3}$ or more and $1 \times 10^{17}$ cm$^{-3}$ or less.

The multimode interference coupler 15 is disposed on the first surface 13c in the first region 13a of the semi-insulating semiconductor substrate 13 and has a plurality of output optical waveguides 15a, 15b, 15c, and 15d and a plurality of input optical waveguides 15e and 15f. In the embodiment, the multimode interference coupler 15 is used for demodulation of phase-modulated optical signals in the coherent optical communications. The integrated optical semiconductor device 11 has a first optical port 14a and a second optical port 14b. For example, the first optical port 14a receives phase-modulated optical signals, which contain multi-level (for example, quaternary) transmission data, from the outside as external optical signals. The second optical port 14b receives reference optical signals to demodulate the external optical signals from the outside. The modulated optical signals from the first optical port 14a are provided for the first optical port of the multimode interference coupler 15 through the input optical waveguide 15e. The optical signals from the second optical port 14b serving as reference optical signals are provided for the second port of the multimode interference coupler 15 through the input optical waveguide 15f. The external signals and the reference optical signals from these two paths interfere in the multimode interference coupler 15. In the multimode interference coupler 15, a plurality of optical signal components each of which has an optical intensity corresponding to one of different phases (levels) in the multi-level transmission data is generated. The optical signal components is provided from the multimode interference coupler 15 to the output optical waveguides 15a, 15b, 15c, and 15d. In the embodiment, the multimode interference coupler 15 includes a 2×4 multimode interference device 29a and a 2×2 multimode interference device 29b. The light receiving device 17 is disposed on the first surface 13c in the second region 13b of the semi-insulating semiconductor substrate 13. The light receiving device 17 is optically coupled to the multimode interference coupler 15. The light receiving device 17 receives the optical signal components from the output optical waveguide of the multimode interference coupler 15 and generates electric signals from the individual optical signal components. In the embodiment, the light receiving device 17 includes four waveguide-type photodiodes 17a, 17b, 17c, and 17d. These photodiodes 17a, 17b, 17c, and 17d are optically coupled to the output optical waveguides 15a, 15b, 15c, and 15d, respectively, of the multimode interference coupler 15 with butt-joint structures therebetween. At a butt-jointed portion in the butt-joint structure, each of the photodiodes 17a, 17b, 17c, and 17d is connected in direct contact with one of the output optical waveguides 15a, 15b, 15c, and 15d. The capacitor 19 is disposed on the first surface 13c in the second region 13b of the semi-insulating semiconductor substrate 13.

The capacitor 19 is electrically connected to one end of the light receiving device 17. The capacitor 19 stabilizes the operation of the light receiving device 17 by filtering and eliminating various noise components included in a bias voltage supplied from a bias power supply. In the embodiment, the capacitor 19 includes parallel plate type capacitors 19a, 19b, 19c, and 19d, Each of the parallel plate type capacitors 19a, 19b, 19c, and 19d includes a first electrode electrically connected to the corresponding photodiode (photodiode 17a, 17b, 17c, or 17d) in the light receiving device 17. Each of the parallel plate type capacitors 19a, 19b, 19c, and 19d further includes a second electrode electrically connected to the second conductive layer 23. The first electrode and the second electrode of each capacitor are disposed on the first surface 13c in the second region 13b of the semi-insulating semiconductor substrate 13. The second conductive layer 23 is disposed on the second surface 13d of the semi-insulating semiconductor substrate 13. Therefore, each of the second electrodes of the parallel plate type capacitors 19a, 19b, 19c, and 19d is electrically connected to the second conductive layer 23 through a conductive material 25 disposed in at least one of through-holes 27 reaching the second surface 13d from the first surface 13c of the semi-insulating semiconductor substrate 13. In the embodiment, each through-hole 27 is formed corresponding to each photodiode (photodiode 17a, 17b, 17c, or 17d). Each cathode electrode of the photodiodes 17a, 17b, 17c, and 17d is electrically connected to the second conductive layer 23 through the corresponding capacitor 19 (capacitor 19a, 19b, 19c, or 19d) and the conductive material 25 in the corresponding through-hole 27. The conductive material 25 is in contact with the side surface of the through-hole 27. By connecting the cathode electrodes of the photodiodes 17a, 17b, 17c, and 17d to the second conductive layer 23 using the conductive materials 25 in the through-hole 27, the light receiving characteristics of the photodiodes 17a, 17b, 17c, and 17d are improved. The thickness of the semi-insulating semiconductor substrate 13 is 80 μm to 150 μm. The size of the through-hole 27 is 20 μm to 100 μm on a diameter basis.

The multimode interference coupler 15 includes a first cladding layer 33 including an n-type semiconductor layer 31, a core layer 35, and a second cladding layer 37. The first cladding layer 33, the core layer 35, and the second cladding layer 37 are stacked on the first surface 13c in the first region 13a of the semi-insulating semiconductor substrate 13 sequentially in the direction normal to the first surface 13c (second axis Ax2) and constitute a stacked semiconductor layer 39 for the waveguide. The n-type semiconductor layer 31 extends to both sides of the multimode interference coupler 15 along the first surface 13c in the first region 13a of the semi-insulating semiconductor substrate 13. The n-type semiconductor layer 31 has a thickness of, for example, 500 to 2,000 nm. The n-type semiconductor layer 31 has an n-type dopant concentration of, for example, $1 \times 10^{17}$ to $1 \times 10^{19}$ cm$^{-3}$. In the embodiment, the first cladding layer 33 is made of a layer same as the n-type semiconductor layer 31, substantially.

According to this integrated optical semiconductor device 11, the n-type semiconductor layer 31 extends from the edge portion of the multimode interference coupler 15 along the first surface 13c in the first region 3a of the semi-insulating semiconductor substrate 13. Therefore, the semi-insulating semiconductor substrate 13 is located between the n-type semiconductor layer 31 and the first conductive layer 21. It has been considered that the semi-insulating semiconductor such as Fe-doped InP has large electric resistance and does not pass a current substantially. The semi-insulating semiconductor substrate has been previously applied to semiconductor devices required to exhibit good high-frequency characteristics. Therefore, in the integrated optical semiconductor device 11, the semi-insulating semiconductor substrate 13 is used as a growth substrate for epitaxial growth.

However, it has been found that a small amount of current flows from the n-type semiconductor layer 31 toward the first conductive layer 21 or the second conductive layer 23 through the semi-insulating semiconductor substrate 13 (hereafter referred to as "substrate leakage current"). The integrated optical semiconductor device 11 includes the n-type semiconductor layer 31 covering the principal surface of the semi-insulating semiconductor substrate 13. The multimode interference coupler 15 and the light receiving device 17 are disposed on the n-type semiconductor layer 31. Therefore, the semi-insulating semiconductor substrate 13 has a large area to form the multimode interference coupler 15 and the light receiving device 17 thereon. The substrate leakage current increases proportionally to the area of the principal surface of the semi-insulating semiconductor substrate 13. As a result, the substrate leakage current increases equal to or more than a dark current of the photodiode.

This substrate leakage current is determined on the basis of the size of the semi-insulating semiconductor substrate 13 and the resistivity of the semi-insulating semiconductor substrate 13. The size of the semi-insulating semiconductor substrate 13 is specified by areas occupied by devices integrated in the integrated optical semiconductor device 11. The resistivity of the semi-insulating semiconductor substrate 13 is specified by the concentration of iron (Fe) impurity in the semi-insulating semiconductor substrate 13. The size and the resistivity of the semi-insulating semiconductor substrate 13 are respectively limited to the predetermined values in the process of design and production of the integrated optical semiconductor device 11. The size and the resistivity of the semi-insulating semiconductor substrate 13 are not able to be specified freely. In the embodiment, the first conductive layer 21 is disposed on the second surface 13d in the first region 13a of the semi-insulating semiconductor substrate 13. In addition, the second conductive layer 23 is disposed on the second surface 13d in the second region 13b of the semi-insulating semiconductor substrate 13. The first conductive layer 21 and the second conductive layer 23 are placed in isolation from each other. As mentioned above, both the first conductive layer 21 and the second conductive layer 23 are disposed on the second surface 13d of the semi-insulating semiconductor substrate 13. When the first conductive layer and the second conductive layer are connected to each other without isolation, a small amount of substrate leakage current mainly flows from the n-type semiconductor layer 31 toward the first conductive layer 21 through the first region of the semi-insulating semiconductor substrate 13 even if the semi-insulating semiconductor substrate 13 base large resistivity. In the embodiment, the second conductive layer 23 has a smaller size (area) than that of the first conductive layer 21. In addition, the first and second conductive layers 21 and 23 are placed in isolation from each other. Therefore, the substrate leakage current passing from the n-type semiconductor layer 31 toward the second conductive layer 23 through the semi-insulating semiconductor substrate 13 is reduced.

The integrated optical semiconductor device 11 has a first edge 11a and a second edge 11b opposite to the first edge 11a. The first edge 11a and the second edge 11b extend in the direction intersecting the first axis Ax1. In the embodiment, the photodiodes 17a, 17b, 17c, and 17d are arranged along the first edge Ha of the integrated optical semiconductor device 11. The capacitors 19a, 19b, 19c, and 19d are also arranged along the first edge 11a. In addition, a plurality of through-via connections including the through-hole 27 and the conductive material 25 disposed in the through-hole 27 are arranged along the first edge 11a. Also, the first optical port 14a and the second optical port 14b are disposed at the second edge 11b. The integrated optical semiconductor device 11 has a third edge 11c and a fourth edge 11d extending in the direction of the first axis Ax1. The third edge 11e is located on the side opposite to the fourth edge 11d.

The light receiving device 17 includes a semiconductor layer 41, a light receiving layer 43, a semiconductor layer 45, and a contact layer 47 that are stacked in that order on the first surface 13c in the second region 13b of the semi-insulating semiconductor substrate 13 in the direction normal to the first surface 13c (second axis Ax2). In the embodiment, the semiconductor layer 41 serves as a lower cladding layer of the light receiving device 17. The semiconductor layer 45 serves as an upper cladding layer of the light receiving device 17. The semiconductor layer 41, the light receiving layer 43, the semiconductor layer 45, and the contact layer 47 constitute a stacked semiconductor layer 49 for the light receiving device 17. The semiconductor layer 41 includes the n-type semiconductor layer 31. According to this integrated optical semiconductor device 11, the light receiving device 17 serving as a waveguide-type photodiode is disposed on the semi-insulating semiconductor substrate 13. Each of the waveguide-type photodiodes in the light receiving device 17 is optically coupled to one of the output optical waveguides 15a to 15d of the multimode interference coupler 15 by using a butt joint structure. At the butt-jointed portion, each of the waveguide-type photodiode is in direct contact with one of the output optical waveguides 15a to 15d to be connected to each other.

In the integrated optical semiconductor device 11, on the first surface 13c in not only the second region 13b but also the first region 13a of the semi-insulating semiconductor substrate 13, the n-type semiconductor layer 31 reaches the edge of the first surface 13c. In the embodiment, the n-type semiconductor layer 31 covers the entire first surface 13c in the first region 13a and the second region 13b.

According to this integrated optical semiconductor device 11, the n-type semiconductor layer 31 is disposed on the entire first surface 13c in the first region 13a and the second region 13b of the semi-insulating semiconductor substrate 13 so that the n-type semiconductor layer 31 reaches the edge of the first surface 13c of the semi-insulating semiconductor substrate 13. The output optical waveguides 15a to 15d of the multimode interference coupler 15 and the light receiving device 17 are formed on the same n-type semiconductor layer 31 that is disposed on the entire first surface 13c in the first region 13a and the second region 13b of the semi-insulating semiconductor substrate 13. In the first region 13a of the semi-insulating semiconductor substrate 13, the first cladding layer 33 having a thickness which is precisely controlled is formed on the n-type semiconductor layer 31 for forming the multimode interference coupler 15.

Since the core layer 35 of the multimode interference coupler 15 including the output optical waveguides 15a to 15d is formed on the first cladding layer 33 having the precisely controlled thickness. Therefore, a distance between the principal surface of the semi-insulating semiconductor substrate 13 and the core layer 35 is easily adjusted to a distance between the principal surface of the semi-insulating semiconductor substrate 13 and the light receiving layer 43 of the light receiving device 17. Consequently, it becomes easy to form the butt-joint structures having a low optical coupling loss between the output optical waveguides 15a to 15d of the multimode interference coupler 15 and the light receiving device 17.

Figure 2:
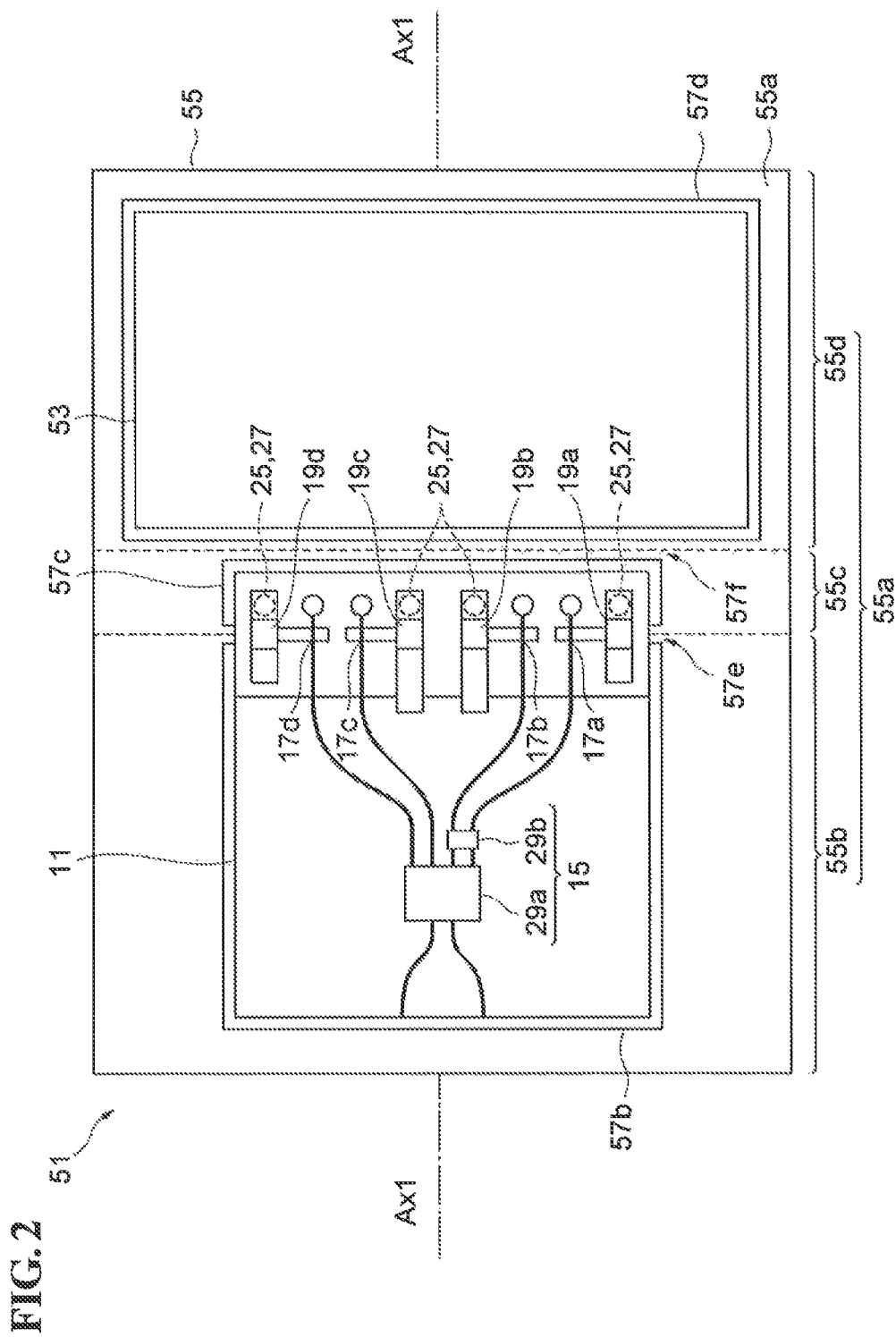
FIG. 2 is a diagram schematically showing an optical receiver according to the present embodiment.

FIG. 2 is a diagram schematically showing an optical receiver according to the present embodiment. An optical receiver 51 includes the integrated optical semiconductor device 11, a signal processing device 53, and a circuit board 55. In the optical receiver 51, the integrated optical semiconductor device 11 and the signal processing device 53 are mounted on the circuit board 55. The signal processing device 53 processes electric signals output from the light receiving device 17 in the integrated optical semiconductor device 11. Specifically, the signal processing device 53 includes an amplifier that amplifies the electric signals output from the light receiving device 17. In the embodiment, the integrated optical semiconductor device 11 and the signal processing device 53 are arranged on the principal surface 55a of the circuit board 55 in the direction of the first axis Ax1.

The principal surface 55a of the circuit board 55 has a first area 55b, a second area 55c, and a third area 55d. The first area 55b, the second area 55e, and the third area 55d are arranged sequentially in the direction of the first axis Ax1 Electrode layers 57b, 57c, and 57d are disposed on the first area 55b, the second area 55c, and the third area 55d of the circuit board 55, respectively. The integrated optical semiconductor device 11 is mounted on the first area 55b and the second area 55c of the circuit board 55 through the electrode layer 57b and the electrode layer 57c, respectively. The signal processing device 53 is mounted on the third area 55d of the circuit board 55 through the electrode layer 57d. Specifically, the first conductive layer 21 of the integrated optical semiconductor device 11 is arranged in the first area 55b in contact with the electrode layer 57b of the circuit board 55. The second conductive layer 23 of the integrated optical semiconductor device 11 is arranged in the second area 55c in contact with the electrode layer 57c of the circuit board 55. On the principal surface 55a of the circuit board 55, the electrode layer 57b is placed in isolation from the electrode layer 57c. In order to electrically isolate the electrode layer 57b from the electrode layer 57c, a gap 57e is disposed between the electrode layer 57b and the electrode layer 57c. Therefore, when the integrated optical semiconductor device 11 is mounted on the circuit board 55 by using above configuration, the first conductive layer 21 and the second conductive layer 23 of the integrated optical semiconductor device 11 are electrically isolated from each other.

The integrated optical semiconductor device 11 may be mounted on the principal surface 55a of the circuit board 55 with a conductive adhesive material therebetween. In this case, the first conductive layer 21 and the second conductive layer 23 of the integrated optical semiconductor device 11 are electrically isolated from each other.

In addition, the electrode layer 57c is placed in isolation from the electrode layer 57d. In order to electrically isolate the electrode layer 57c from the electrode layer 57d, a gap 57f is disposed between the electrode layer 57c and the electrode layer 57d.

Figure 3:
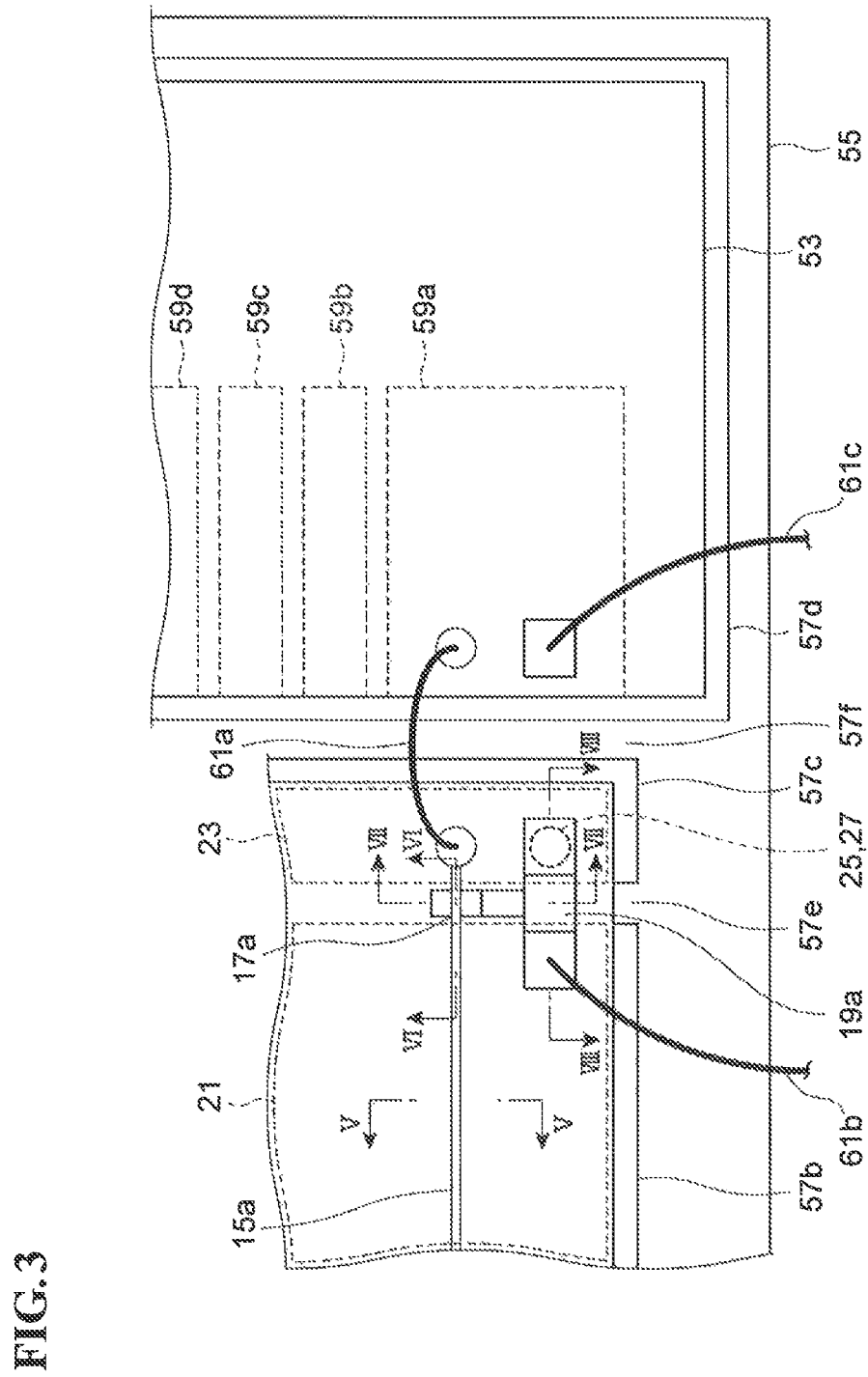
FIG. 3 is a magnified diagram schematically showing electrical connection between an integrated optical semiconductor device and a signal processing device in the optical receiver according to the present embodiment.

FIG. 3 is a magnified diagram schematically showing electric connection between the integrated optical semiconductor device and the signal processing device in the optical receiver according to the present embodiment. The signal processing device 53 includes an amplifier 59a to amplify electric signals from the photodiode 17a of the integrated optical semiconductor device 11. The signal processing device 53 also includes amplifiers 59b, 59c, and 59d to amplify electric signals from the photodiodes 17b, 17c, and 17d of the integrated optical semiconductor device 11, respectively. The integrated optical semiconductor device 11 is connected to the signal processing device 53 through, for example, a bonding wire 61a. For example, electric signals from the photodiode 17a are transmitted to the amplifier 59a through the bonding wire 61a. A cathode voltage is supplied to the integrated optical semiconductor device 11 through the bonding wire 61b. A reference voltage for the amplifier is supplied to the signal processing device 53 through the bonding wire 61c.

Figure 4A:
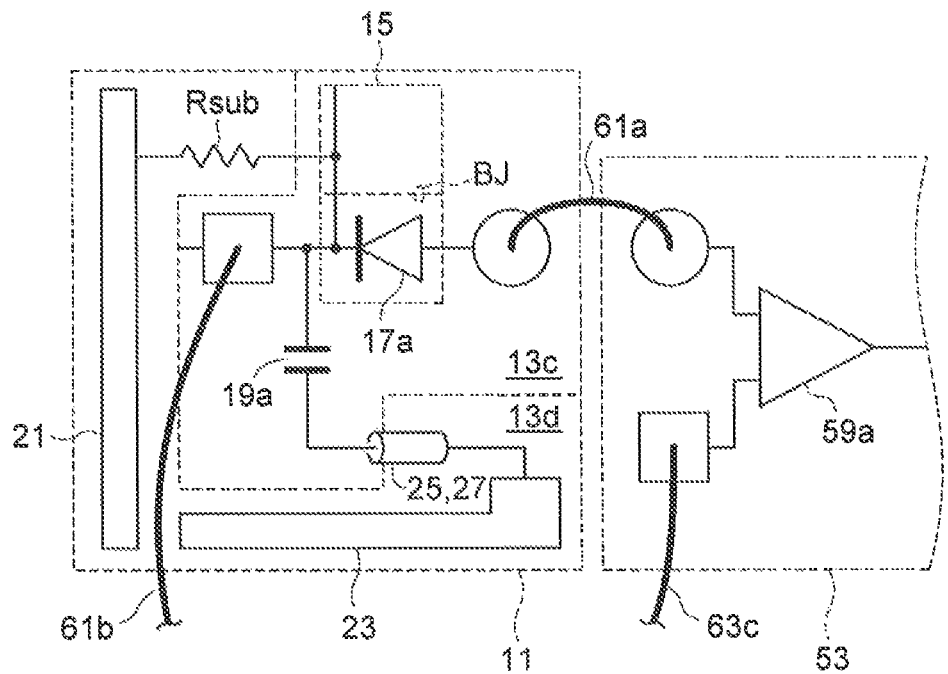
FIGS. 4A and 4B are drawings showing electric devices and electric connection of the optical receiver according to the present embodiment.

FIG. 4A is a schematic drawing showing an electric wiring circuit for the optical receiver 51 including the integrated optical semiconductor device 11 and the signal processing device 53. The resistance Rsub shows equivalent electric resistance of the semi-insulating semiconductor substrate 13 and is, for example, about $3 \times 10^6$ Ω. As described above, the first conductive layer 21 and the second conductive layer 23 are disposed on the second surface 13d of the semi-insulating semiconductor substrate 13. The multimode interference coupler 15, the light receiving device 17, and the capacitor 19 are disposed on the first surface 13c of the semi-insulating semiconductor substrate 13. One end of the capacitor 19 is connected to the second conductive layer 23 through the conductive material 25 in the through-hole 27. The second conductive layer 23 is electrically isolated from the first conductive layer 21 connected to the resistance Rsub.

Figure 4B:
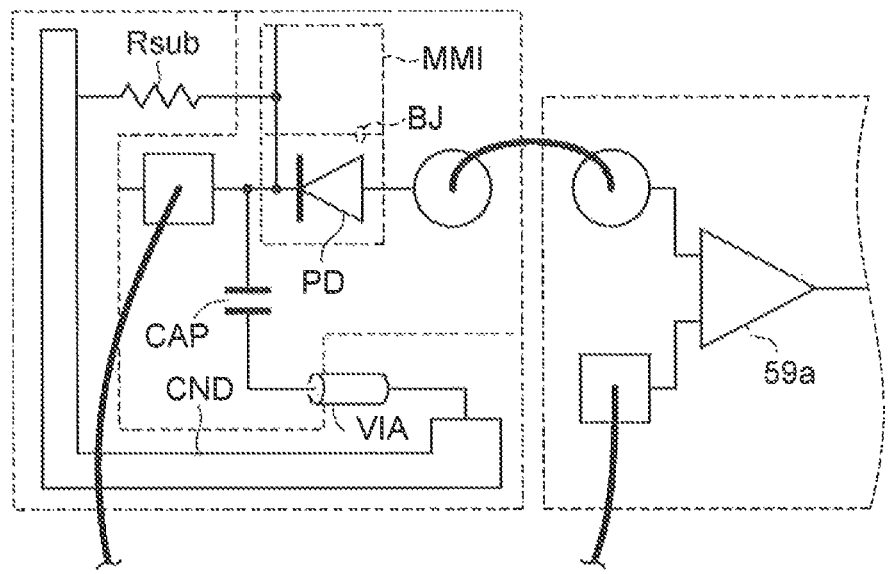

Similarly, FIG. 4B is a schematic drawing showing an electric wiring circuit for another optical receiver including the integrated optical semiconductor device and the signal processing device. Electric connections related to a semi-insulating semiconductor substrate SUB of this optical receiver are also shown. The resistance Rsub shows equivalent electric resistance of the semi-insulating semiconductor substrate SUB. As with the optical receiver 51 shown in FIG. 4A, a multimode interference coupler MMI, a light receiving device PD, and a capacitor CAP are disposed on a first surface of the semi-insulating semiconductor substrate SUB. However, the entire surface of a second surface of the semi-insulating semiconductor substrate SUB is covered with a conductive layer CND. One end of the capacitor CAP is connected to the conductive layer CND through a conductive material in a through-hole disposed in the semi-insulating semiconductor substrate SUB. The conductive layer CND is connected to the resistance Rsub. Consequently, a current flows from the multimode interference coupler MMI and an n-type semiconductor layer of the light receiving device PD to the conductive layer CND through the semi-insulating semiconductor substrate SUB (resistance Rsub).

Figure 5:
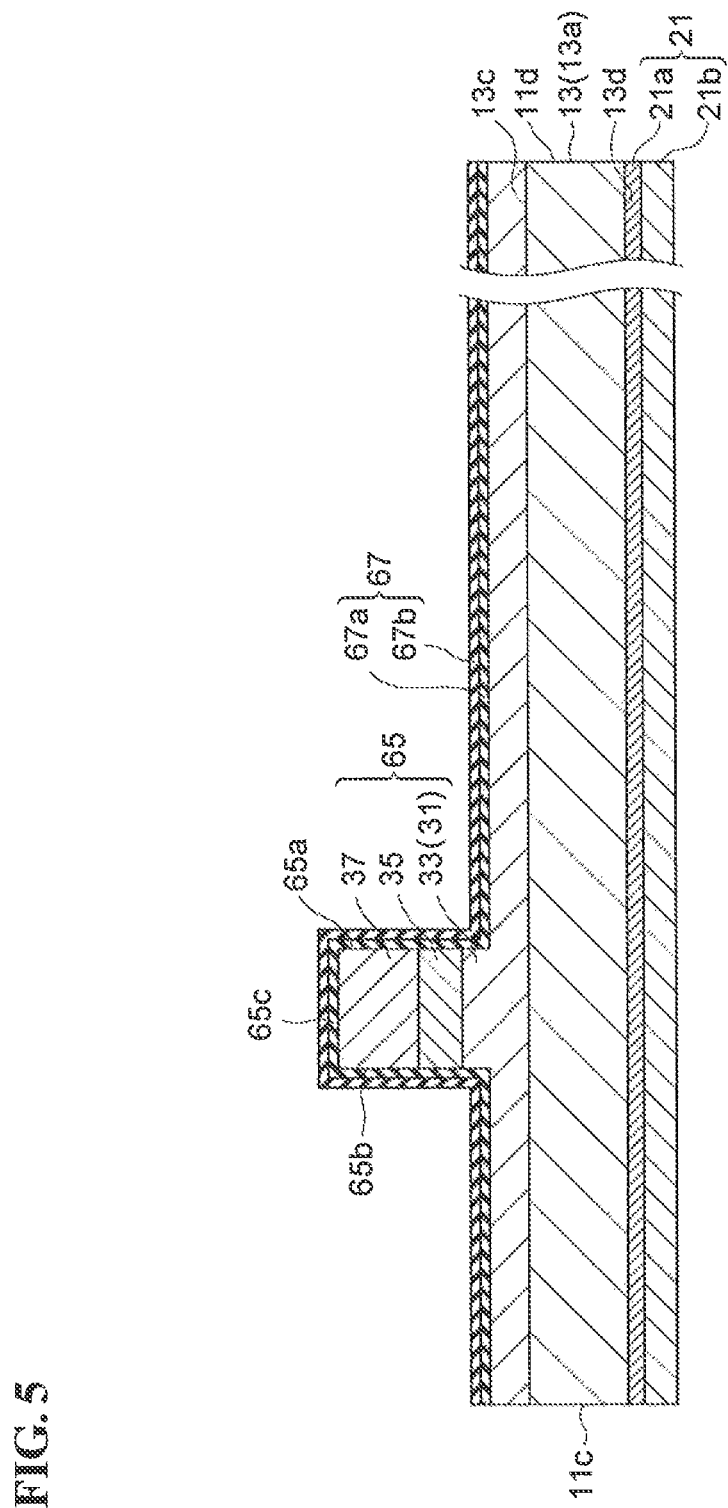
FIG. 5 is a drawing showing a cross-section taken along a line V-V shown in FIG. 3.

FIG. 5 is a drawing showing a cross-section taken along a line V-V shown in FIG. 3. The structure of an optical waveguide 65 to connect the multimode interference coupler 15 to the light receiving device 17 will be described with reference to FIG. 5. For example, the structure of the optical waveguide 65 is applied to the output optical waveguides 15a to 15d and the input optical waveguides 15e and 15f. The optical waveguide 65 includes the first cladding layer containing the n-type semiconductor layer 31, the core layer 35, and the second cladding layer 37. In the embodiment, the n-type semiconductor layer 31 is defined as the first cladding layer 33. The n-type semiconductor layer 31 is formed on the entire principal surface of the semi-insulating semiconductor substrate 13. The core layer 35 is disposed on the n-type semiconductor layer 31. The second cladding layer 37 is disposed on the core layer 35. The refractive index of the core layer 35 is larger than the refractive indices of the n-type semiconductor layer 31 and the second cladding layer 37.

An example of the stacked semiconductor layer for the optical waveguide 65 is as described below.

n-type semiconductor layer 31 (first cladding layer 33): Si-doped InP core layer 35: InGaAsP having a band gap wavelength of 1.05 μm second cladding layer 37: undoped InP The optical waveguide 65 has a mesa structure and has a pair of side surfaces 65a and 65b. An insulating layer 67 covers the pair of side surfaces 65a and 65b and an upper surface 65c of this mesa structure.

The insulating layer 67 (in the present embodiment, insulating layers 67a and 67b) protects the mesa structure. The insulating layers 67a and 67b are made of for example, a silicon based inorganic compound (silicon nitride (SiN), oxynitride (SiON), or silicon dioxide ($SiO_2$)).

The n-type semiconductor layer 31 extends from the pair of side surfaces 65a and 65b of the mesa structure. In the embodiment, the n-type semiconductor layer 31 reaches the edge of the first surface 13c of the semi-insulating semiconductor substrate 13 on the first surface 13c in the first region 13a of the semi-insulating InP substrate 13. Specifically, the n-type semiconductor layer 31 reaches the second edge 11b, the third edge 11c, and the fourth edge 11d on the first surface 13c in the first region 13a of the semi-insulating semiconductor substrate 13. The n-type semiconductor layer 31 is disposed on the first surface 13c in the first region 13a of the semi-insulating semiconductor substrate 13 such that the n-type semiconductor layer 31 reaches the edge (edge of the integrated semiconductor device) of the first surface 13c of the semi-insulating semiconductor substrate 13. As described above, it becomes easy to form the butt-joint structure for optical coupling between the optical waveguide 65 of the multimode interference coupler 15 and the light receiving device 17.

Figure 6:
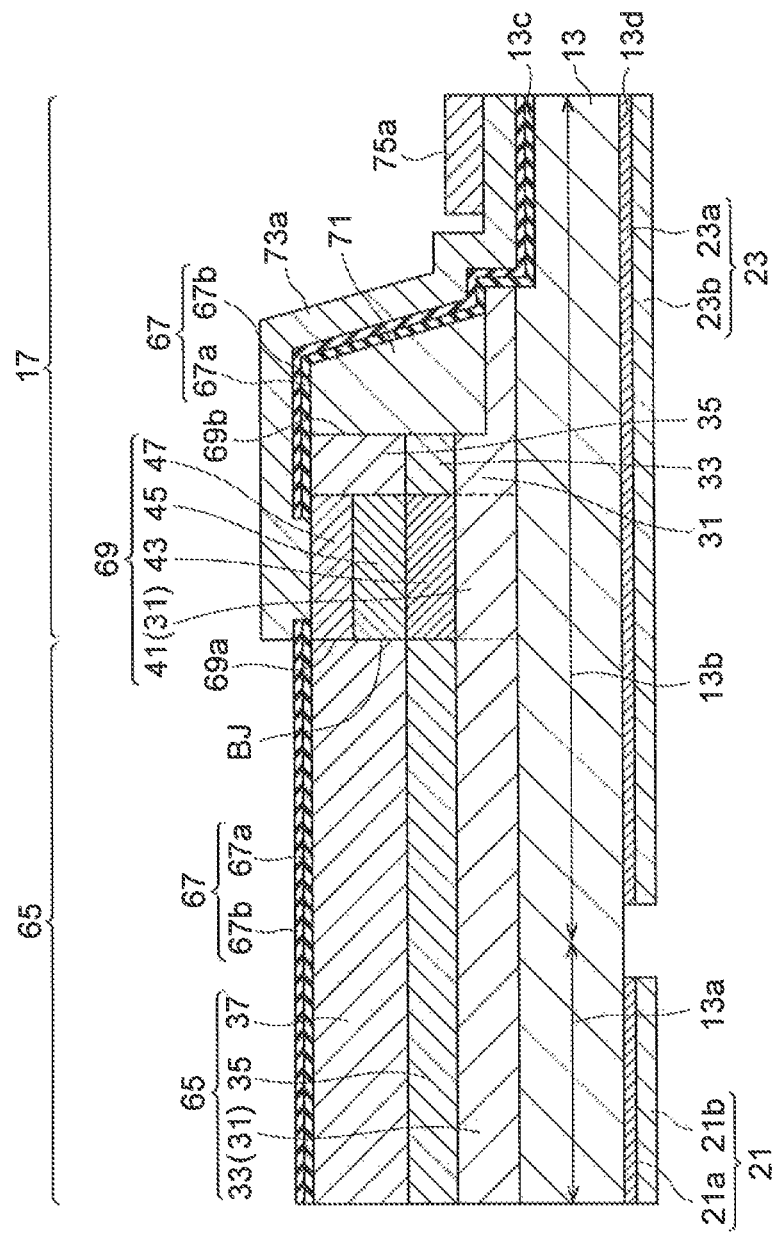
FIG. 6 is drawing showing across-section taken along a line VI-VI shown in FIG. 3.
Figure 7:
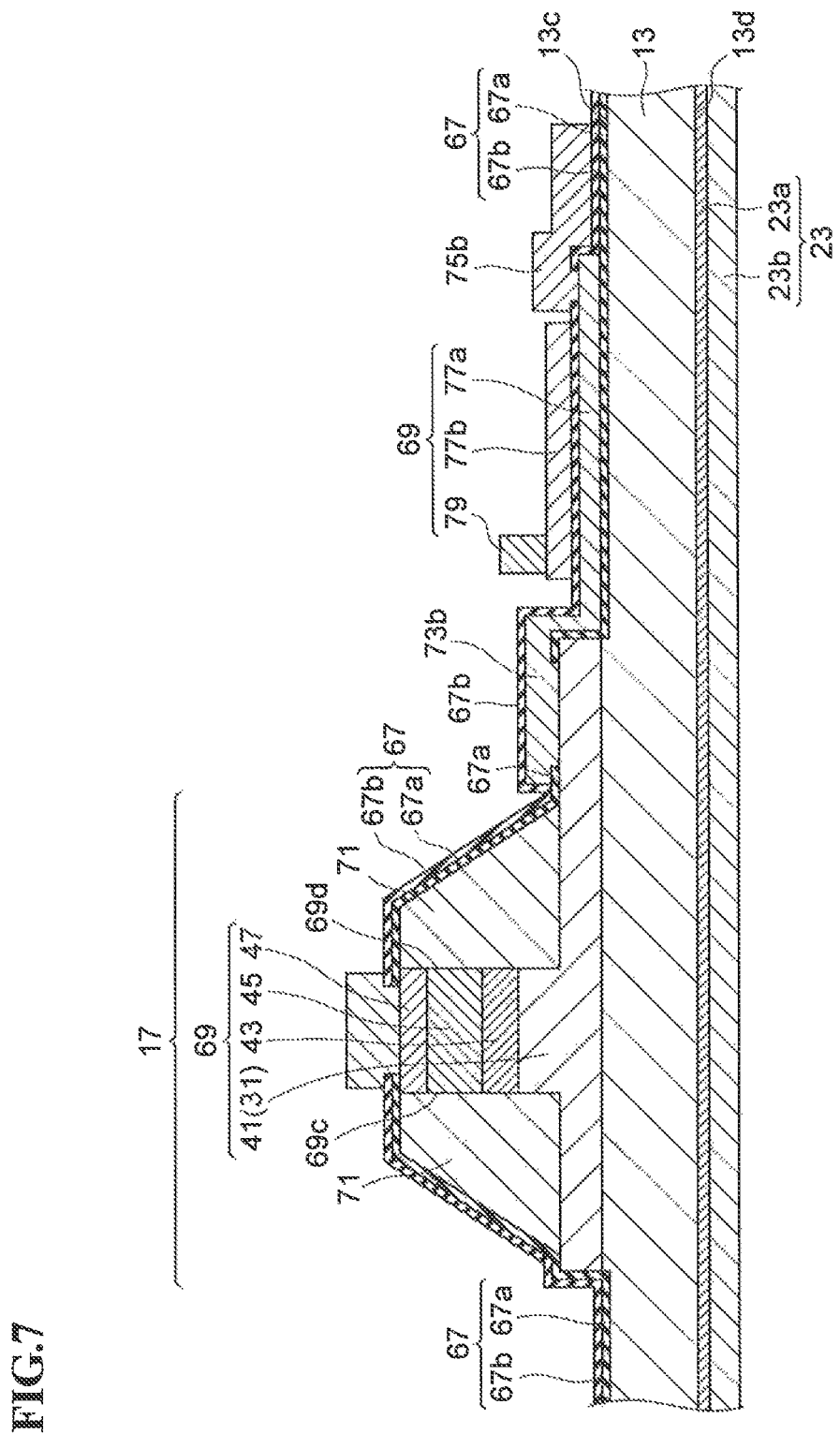
FIG. 7 is a drawing showing a cross-section taken along a line VII-VII shown in FIG. 3.

FIG. 6 is a drawing showing a cross-section taken along a line VI-VI shown in FIG. 3. FIG. 7 is a drawing showing a cross-section taken along a line VII-VII shown in FIG. 3. Referring to FIG. 6, the optical waveguide 65 is optically connected to the light receiving device 17 at the butt-jointed portion BJ. Referring to FIG. 7, an electric connection between the light receiving device 17 and the capacitor 19 is shown. The light receiving device 17 includes the semiconductor layer 41, the light receiving layer 43, the semiconductor layer 45, and the contact layer 47. The semiconductor layer 41 includes the n-type semiconductor layer 31. In the embodiment, the semiconductor layer 41 is substantially made of a layer same as the n-type semiconductor layer 31. The semiconductor layer 41, the light receiving layer 43, the semiconductor layer 45, and the contact layer 47 are arranged on the first surface 13c in the second region 13b of the semi-insulating InP substrate 13 sequentially in the direction normal to the first surface 13c and constitute a waveguide-type photodiode.

An example of a stacked semiconductor layer constituting the light receiving device 17 is shown.

semiconductor layer 41 (n-type semiconductor layer 31): Si-doped n-type InP light receiving layer 43: undoped InGaAs semiconductor layer 45: Zn-doped p-type InP contact layer 47: Zn-doped InGaAs According to this integrated optical semiconductor device 11, the light receiving device 17 includes a mesa-shaped stacked semiconductor layer. The light receiving device 17 has a waveguide-type photodiode structure and is disposed on the semi-insulating semiconductor substrate 13. This waveguide-type photodiode structure is optically coupled to the output optical waveguide of the multimode interference coupler 15 at the butt-jointed portion BJ. At the butt-jointed portion BJ, the waveguide-type photodiode structure and the output optical waveguide of the multimode interference coupler 15 are in direct contact with each other.

Specific explanation for fabricating the integrated optical semiconductor device 11 will be described below. A stacked semiconductor layer to constitute the light receiving device 17 is formed on the semi-insulating semiconductor substrate 13 by the first epitaxial growth. In the first epitaxial growth, the stacked semiconductor layer includes the semiconductor layer 41 (n-type semiconductor layer 31), the light receiving layer 43, the semiconductor layer 45, and the contact layer 47. Thereafter, the light receiving layer 43, the semiconductor layer 45, and the contact layer 47 in the stacked semiconductor layer is etched so as to expose a surface of the semiconductor layer 41 by using an etching mask having a pattern covered on the area in which the light receiving device 17 is to be formed. The etching mask is made of a SiN film, a SiON film, or a $SiO_2$ film. Subsequently, a plurality of semiconductor layers (for example, core layer 35 and second cladding layer 37) are selectively grown on the exposed surface of the semiconductor layer 41 using the etching mask as a selective growth mask so as to form the multimode interference coupler 15 (second epitaxial growth). The multimode interference coupler 15 is optically coupled to the light receiving device 17 by using the butt-joint structure. In the second epitaxial growth, the core layer 35 and second cladding layer 37 constituting the multimode interference coupler 15 are grown on the semiconductor layer 41 including the n-type semiconductor layer 31 that also constitute the light receiving device 17. Therefore, the distance of the core layer 35 from the principal surface of the semi-insulating semiconductor substrate 13 is easily adjusted to the distance of the light receiving layer 43 from the principal surface of the semi-insulating semiconductor substrate 13. In addition, the thickness of the staked semiconductor layer grown in the second epitaxial growth is small. Especially, almost no semiconductor layers are grown under the core layer 35 because the semiconductor layer 41 is already formed before the growth of the core layer 35. Therefore, the thicknesses of the semiconductor layers including the core layer 35 are easily adjusted to a designed thickness with high accuracy. As a result, the optical waveguide 65 of the multimode interference coupler 15 is optically coupled to the light receiving device 17 with high optical coupling efficiency and low optical coupling loss. In the embodiment, the semiconductor layer 41 (the n-type semiconductor layer 31) of the light receiving device 17 also serves as the first cladding layer 33 of the multimode interference coupler 15 and the optical waveguide 65.

The integrated optical semiconductor device 11 includes the butt-jointed portion RJ at which one of the optical waveguide 65 is connected in direct contact with the light receiving device 17. This butt-jointed portion BJ is disposed on one edge surface 69a of the mesa structure 69 of the light receiving device 17. As shown in FIG. 7, the other edge surfaces 69b, 69c, and 69d of the mesa structure 69 are buried with a buried region 71. The buried region 71 is made of a semi-insulating semiconductor such as Fe-doped InP, for example. The insulating layer 67 is formed on a top surface and aside surface of the buried region 71.

Referring to FIG. 6 again, the insulating layer 67 has an opening disposed on the upper surface of the mesa structure 69. The upper surface of the mesa structure 69 of the light receiving device 17 is exposed through the opening. The anode electrode 73a is in contact with the contact layer 47 of the mesa structure 69 through this opening. The anode electrode 73a extends along the insulating layer 67 and is connected to a pad electrode 75a. The anode electrode 73a is made of, for example, AuZn or Pt. The pad electrode 75a is made of for example, gold (Au).

In FIG. 7, the semiconductor layer 41 (n-type semiconductor layer 31) extends from the side surface of the mesa structure 69 in the direction intersecting the first axis Ax1 and has an edge surface on the semi-insulating semiconductor substrate 13. The buried region 71 is formed on the side surfaces (edge surface 69c and 69d) of the mesa structure 69 and the semiconductor layer 41. The insulating layer 67a constitutes one part of the insulating layer 67 that is formed on the top surface of the mesa structure 69 and covers the top surface and the side surface of the buried region 71. In addition, the insulating layer 67a is continued from the insulating layer 67 and is disposed on the semiconductor layer 41 (n-type semiconductor layer 31). The insulating layer 67a has an opening disposed on the semiconductor layer 41 (n-type semiconductor layer 31). A surface of the semiconductor layer 41 (n-type semiconductor layer 31) is exposed through the opening. A cathode electrode 73b is formed in the opening of the insulating layer 67a in contact with the semiconductor layer 41 (n-type semiconductor layer 31). The cathode electrode 73b is made of, for example, AuGe or AuGeNi. The cathode electrode 73b extends to an area in the first surface 13c of the semi-insulating semiconductor substrate 13 through the edge surface of the semiconductor layer 41 (n-type semiconductor layer 31). In this area, the cathode electrode 73b functions as a lower electrode 77a of the capacitor 19. The insulating layer 67b constituting another part of the insulating layer 67 extends from the insulating layer 67 and is disposed on the cathode electrode 73b and the lower electrode 77a. An upper electrode 77b of the capacitor 19 is disposed on the insulating layer 67b. The insulating layer 67b is disposed between the lower electrode 77a and the upper electrode 77b. These lower electrode 77a, insulating layer 67b, and upper electrode 77b constitute a parallel plate type capacitor. The upper electrode 77b and the lower electrode 77a have a stacked metal layer structure, e.g., TiW/Au or Ti/Pt/Au. In the embodiment, more specifically, the lower electrode 77a, the insulating layer 67b, and the upper electrode 77b constitute a capacitor having a metal-insulator-metal (MIM) structure. The insulating layer 67b constituting the capacitor 19 is made of, for example, SiON. The capacitor 19 is applied for the purpose of stabilizing a bias voltage supplied to the light receiving device 17.

The cathode electrode 73b further extends through the area on which the capacitor 19 is formed so as to be connected to a pad electrode 75b. The cathode electrode 73b is in contact with the pad electrode 75b through an opening disposed in the insulating layer 67b. The pad electrode 75b is located on the insulating layer 67 including the insulating layer 67a and insulating layer 67b. The cathode electrode 73b has an edge surface on the semi-insulating semiconductor substrate 13. The insulating layer 67 covers the edge surface of the cathode electrode 73b.

Figure 8:
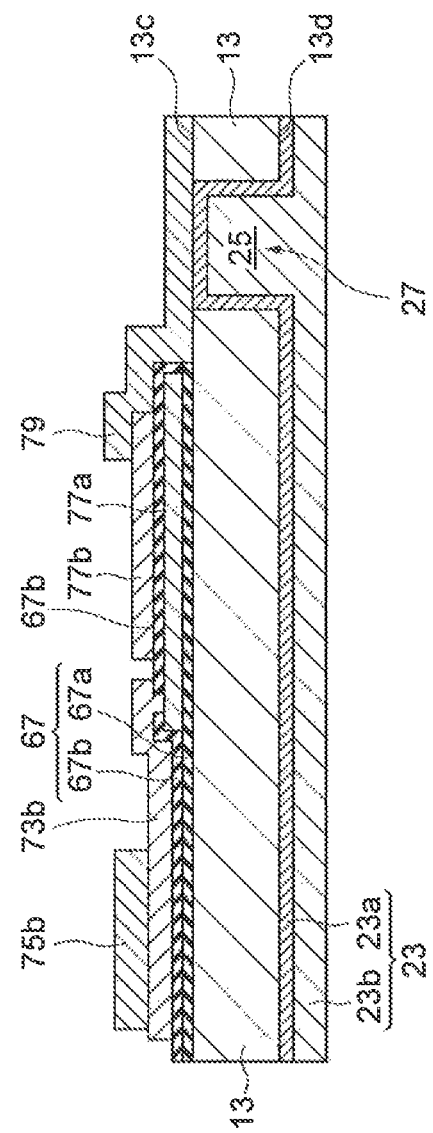
FIG. 8 is a drawing showing connection between a through-hole, a conductive material, and a capacitor.

FIG. 8 is a drawing showing an electric connection between a capacitor and a through-via (through-hole and conductive material). A wring conductor 79 connected to the upper electrode 77b of the capacitor 19 crosses the edge of the capacitor 19 and extends on an area in the first surface 13c of the semi-insulating semiconductor substrate 13. In this area, the through-hole 27 is disposed. The through-hole 27 reaches the second surface 13d from the first surface 13c of the semi-insulating semiconductor substrate 13. The through-hole 27 is filled with the conductive material 25. The conductive material 25 is electrically connected to the second conductive layer 23 disposed on the second surface 13d in the second region 13b of the semi-insulating semiconductor substrate 13. In the embodiment, in order to form the first conductive layer 21 and the second conductive layer 23, a seed layer 23a and a plating layer 23b are formed. The seed layer 23a is formed on the back surface of the wiring conductor 79, the second surface 13d in the second region 13b, and the side surface of the through-hole 27. The seed layer 23a includes a first layer that includes an adhesion layer or a barrier layer. The first layer is in contact with a semi-insulating semiconductor of the second surface 13d of the semi-insulating semiconductor substrate 13 so as to form an alloy with each other. The seed layer 23a may further include a second layer which is disposed on the first layer and which is made of the same material as the material for the plating layer. The plating layer 23b is formed on the seed layer 23a by, for example, gold plating. The materials for the seed layer 23a and the plating layer 23b are the same as the materials for a seed layer 21a and a plating layer 21b, respectively, of the first conductive layer 21. Therefore, in the embodiment, a seed conductive layer for forming the seed layer 21a and the seed layer 23a is formed. In addition, a plating layer for forming the plating layer 21b and the plating layer 23b is formed on the seed conductive layer and, thereby, a stacked metal layer is formed. Thereafter, the stacked metal layer is patterned by using photolithography and etching the seed conductive layer and the plating layer so as to form the first conductive layer 21 and the second conductive layer 23. Subsequently, an isolation groove between the first conductive layer 21 and the second conductive layer 23 is formed in the back surface of the substrate. In the isolation groove, the seed conductive layer and the plating layer that have relatively laree electrical conductivity are removed. A surface of the semi-insulating semiconductor substrate 13 is exposed at the bottom of the isolation groove.

FIGS. 9A to 9C, FIGS. 10A to 10C, FIGS. 11A to 11C, FIGS. 12A to 12E, FIGS. 13A to 13D, FIGS. 14A and 14B, and FIGS. 15A and 15B are drawings schematically showing main steps in a method for producing an integrated optical semiconductor device. As shown in FIG. 9A, semiconductor layers to form the photodiodes 17a to 17d, specifically, a stacked semiconductor layer 83 including an n-type InP layer 83a, an n-type GaInAsP layer 83b, an InGaAs optical absorption layer 83c, a p-type GaInAsP layer 83d, a p-type InP layer 83e, a p-type GaInAsP layer 83f, and a p-type InGaAs layer 83g, is grown on a semi-insulating InP wafer 81 by using an epitaxial growth method such as a metal-organic vapor phase epitaxy (MOVPE) method in the first epitaxial growth step. The n-type GaInAsP layer 83b, the p-type GaInAsP layer 83d, and the p-type GaInAsP layer 83f function as heterostructure barrier buffer layers. Referring to FIG. 9B, an insulating layer mask 85 is formed by using a photolithography method and an etching method. The stacked semiconductor layer 83 is etched by using the insulating layer mask 85, so that a stripe-shaped mesa structure 84 is formed in an area in which the photodiodes 17a to 17d are arranged. The stripe-shaped mesa structure 84 includes the n-type GaInAsP layer 83b, the InGaAs optical absorption layer 83c, the p-type GaInAsP layer 83d, the p-type InP layer 83e, the p-type GaInAsP layer 83f, and the p-type InGaAs layer 83g. The n-type InP layer 83a is left on the entire surface of the wafer. In the second epitaxial growth step, a core layer and an upper cladding layer are grown on the n-type InP layer 83a for forming the optical waveguide 65 while part of or all the n-type InP layer 83a grown in the first epitaxial growth step is left on the wafer. As shown in FIG. 9B, in the second epitaxial growth step, the insulating layer mask 85 is left. Specifically, a stacked semiconductor layer 87 including a core layer 87a and an upper cladding layer 87b, is selectively grown by using the insulating layer mask 85 as an selective growth mask to form the optical waveguide 65. For example, the core layer 87a is made of undoped InGaAsP. The upper cladding layer 87b is made of undoped InP. Here, the n-type InP layer 83a serves as a lower cladding layer of the photodiodes 17a to 17d. Simultaneously, the n-type InP layer 83a serves as the first cladding layer 33 of the optical waveguide 65. The insulating layer mask 85 is removed, so that, as shown in FIG. 9C, a stacked semiconductor epitaxial layer 86 including a butt joint coupling between the stripe-shaped mesa structure 84 and the stacked semiconductor layer 87 is formed on the semi-insulating InP wafer 81 by these steps. In the embodiment, the stacked semiconductor layer 87 is formed so as to sandwich the stripe-shaped mesa structure 84 therebetween in the direction of the first axis Ax1. FIG. 9A and FIG. 9B show across-section taken along the direction of the first axis Ax1 shown in FIG. 9C.

Figure 10A:
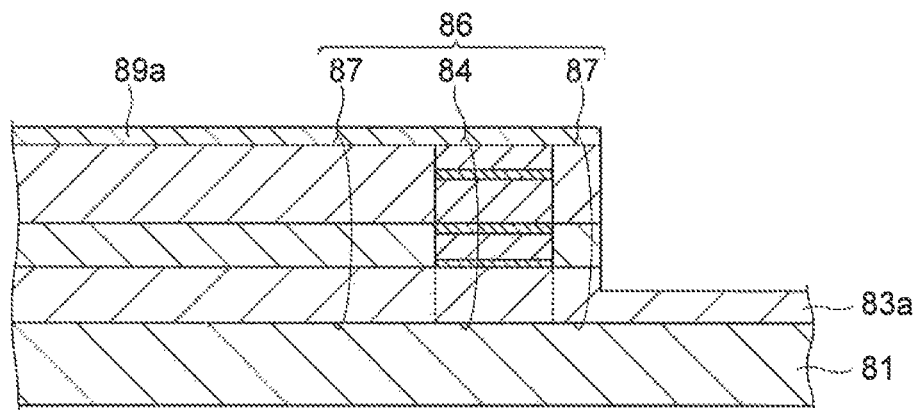
FIGS. 10A, 10B, and 10C are drawings schematically showing main steps in a method for producing an integrated optical semiconductor device.
Figure 10B:
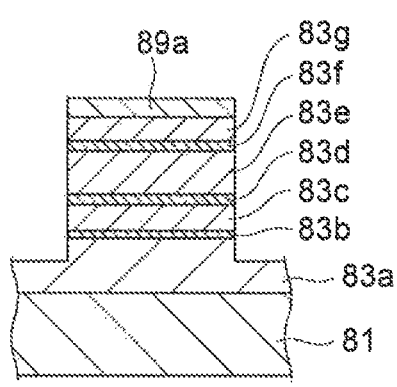
Figure 10C:
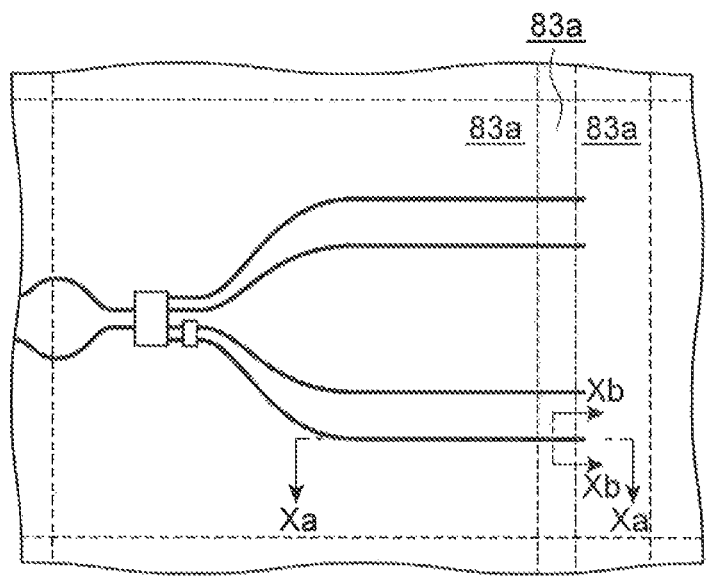

As shown in FIG. 10A and FIG. 10B, a mask 89a is formed on the stacked epitaxial semiconductor layer 86 by using a photolithography method. The stacked epitaxial semiconductor layer 86 is etched until reaching the middle of the n-type InP layer 83a by using the mask 89a as an etching mask. As a result of this etching, the optical waveguides having a mesa structure to constitute the multimode interference coupler 15 and the optical waveguide 65 optically connected to the multimode interference coupler 15, and another mesa structure to constitute the photodiodes 17a to 7d are simultaneously formed. In this etching, an end surface of the stacked semiconductor layer 87 is formed at the end of the stacked semiconductor layer 87 in the direction of the first axis Ax1. The mask 89a used for this etching is made of, for example, a SiN film. The mask 89a has a pattern to define the optical waveguides to constitute the multimode interference coupler 15 and the optical waveguide 65, and the mesa structure to constitute the photodiodes 17a to 17d. FIG. 10C is a plan view showing a substrate product after the epitaxial growth and shows an area corresponding to a single device of the integrated optical semiconductor device. FIG. 10A is a drawing showing a cross-section taken along a line Xa-Xa shown in FIG. 10C. FIG. 10B is a drawing showing a cross-section taken along a line Xb-Xb shown in FIG. 10C.

Figure 11A:
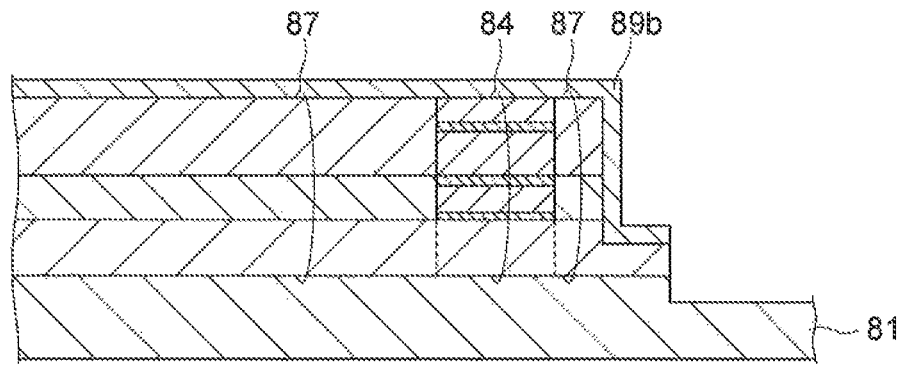
FIGS. 11A, 11B, and 11C are drawings schematically showing main steps in a method for producing an integrated optical semiconductor device.
Figure 11B:
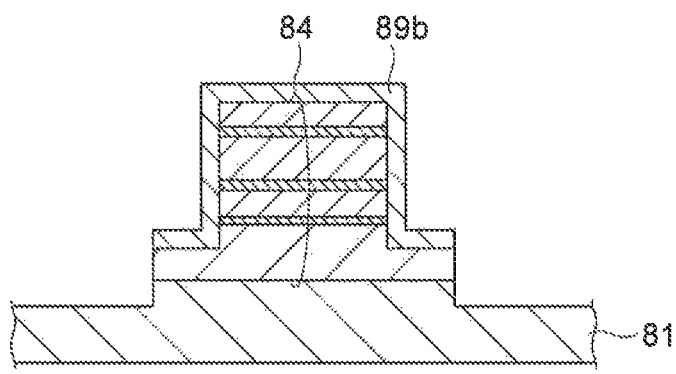
Figure 11C:
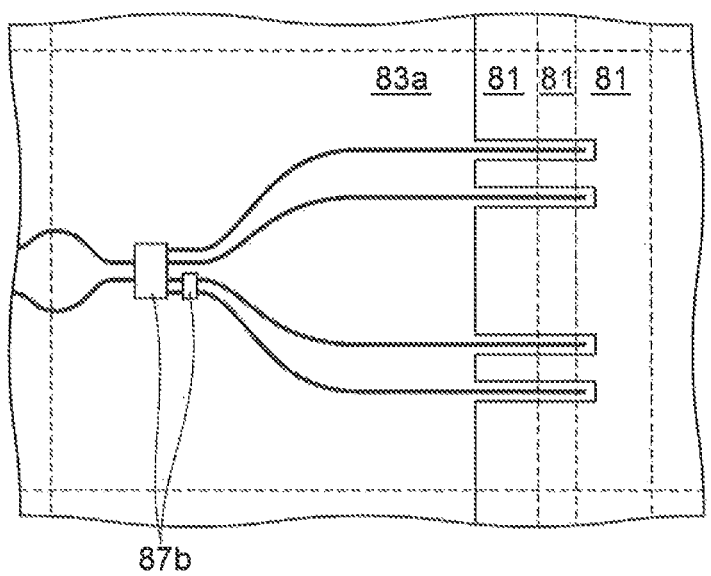

The mask 89a is removed. Thereafter, cathode electrodes of the individual photodiodes are isolated by etching the n-type InP layer 83a. As shown in FIG. 11A and FIG. 11B, a mask 89b is formed on top surfaces and side surfaces of the optical waveguides including the optical waveguide 65 and the multimode interference coupler 15. The mask 89b is also formed on the end surface of the stacked semiconductor layer 87. In addition, the mask 89b is formed on atop surface, a side surface of the mesa structure to constitute the photodiodes 17a to 17d. In addition, by using this mask 89b as an etching mask, a part of the n-type InP layer 83a and the semi-insulating InP wafer 81 are etched until reaching the middle of the semi-insulating InP wafer 81 in the area in which the photodiodes are formed. The mask 89b is made of, for example, a SiN film. In order to facilitate understanding of relation between a series of steps, FIG. 11A and FIG. 11B show progress in the cross-sections in the step following the step shown in FIG. 10A and FIG. 10B, respectively. The semi-insulating InP wafer 81 is exposed at the area from which the n-type InP layer 83a has been removed by etching. FIG. 11C is a plan view showing a substrate product after the mask 89b used for the etching is removed and shows an area corresponding to a single device of the integrated optical semiconductor device.

Figure 12A:
FIGS. 12A to 12E are drawings schematically showing main steps in a method for producing an integrated optical semiconductor device.
Figure 12B:
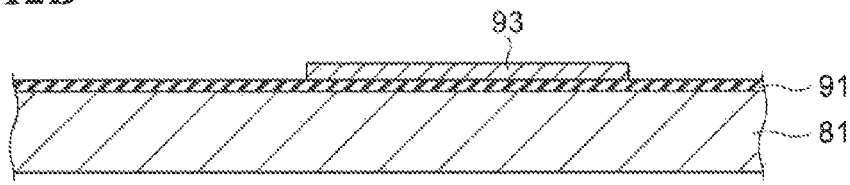
Figure 12C:
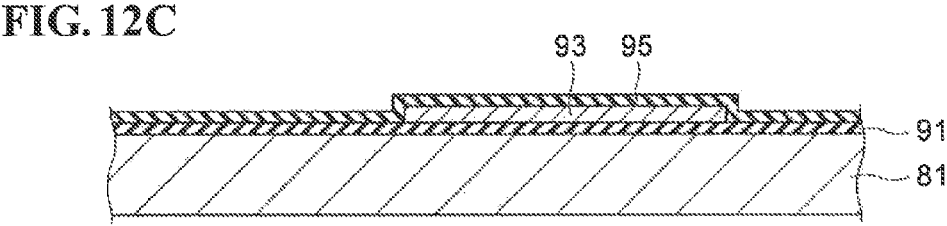
Figure 12D:
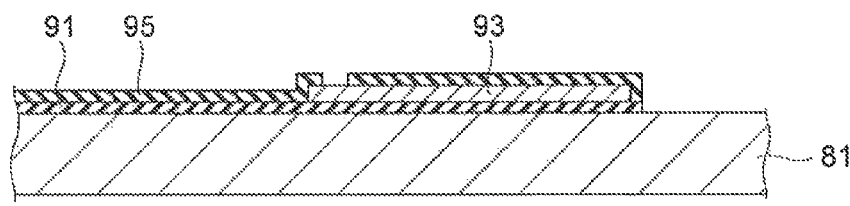
Figure 12E:
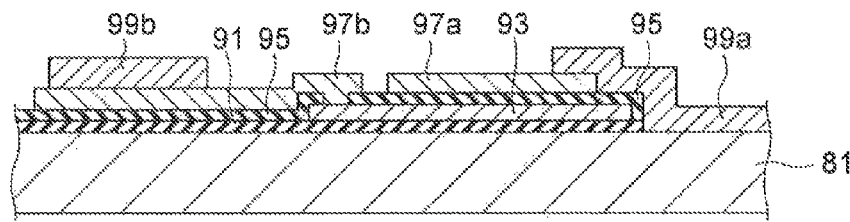

Subsequently, a step of forming the capacitor on the semi-insulating InP wafer 81 will be described. FIGS. 12A to 12E show cross-sections in a series of steps for forming a capacitor. After the n-type InP layer 83a is etched to isolate the cathode electrodes of the photodiodes from each other, as shown in FIGS. 12A to 12E, the capacitor 19 is integrated on the semi-insulating InP wafer 81. Specifically, after the steps of the formation of the mesa structures of the optical waveguides and the photodiodes, and the formation of the isolated n-type InP layer 83a, as shown in FIG. 12A, an insulating layer 91 is formed on the entire surface of the semi-insulating InP wafer 81. The insulating layer 91 is made of a silicon based inorganic insulating layer such as a SiN film. Then, as shown in FIG. 12B, a lower electrode 93 of the capacitors 19a to 19d is formed. The lower electrode 93 is made of, for example, Ti/Pt/Au. If necessary, an opening for electric connection to the n-type InP layer 83a (n-type semiconductor layer 31) of the photodiodes 17a to 17d may be formed in the insulating layer 91 prior to the formation of the lower electrode 93 and, thereafter, the cathode electrode for the photodiodes 17a to 17d may be formed. After the formation of the lower electrode 93, as shown in FIG. 12C, another insulating layer made of a silicon based inorganic insulating layer such as a SiON film and a SiN film, is formed on the entire surface of the semi-insulating InP wafer 81 so as to cover the lower electrode 93 with another insulating layer 95. As shown in FIG. 12D, an opening is formed in the insulating layer 95 on the lower electrode 93. Then, as shown in FIG. 12E, an upper electrode 97a of the capacitors 19a to 19d and a wiring conductor 97b electrically connected to the lower electrode 93 are formed. The lower electrode 93, the insulating layer 95, and the upper electrode 97a constitute the capacitors 19a to 19d having a parallel plate type structure (MIM structure). The upper electrode 97a and the wiring conductor 97b are made of, for example, TiW/Pt/Au. After the upper electrode 97a and the wiring conductor 97b are formed, a gold plating layer 99a connected to a through-via and a gold plating layer 99b to constitute an electrode pad are formed. If necessary, in order to form the anode electrodes of the photodiodes 17a to 17d, openings are formed in the insulating layer 91 and another insulating layer 95 on upper surfaces of the mesa structures constituting the photodiodes 17a to 17d. And then, the anode electrodes of the photodiodes 17a to 17d are formed in the openings. For example, the step of forming the opening for the upper electrode 97a and the step of forming the opening for the anode electrode may be performed in the same step. In addition, the step of forming the upper electrode 97a and the step of forming the anode electrode may be performed in the same step.

Figure 13A:
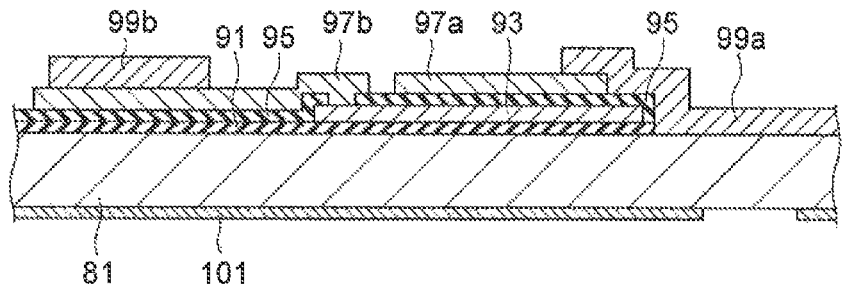
FIGS. 13A to 13D are drawings schematically showing main steps in a method for producing an integrated optical semiconductor device.
Figure 13B:
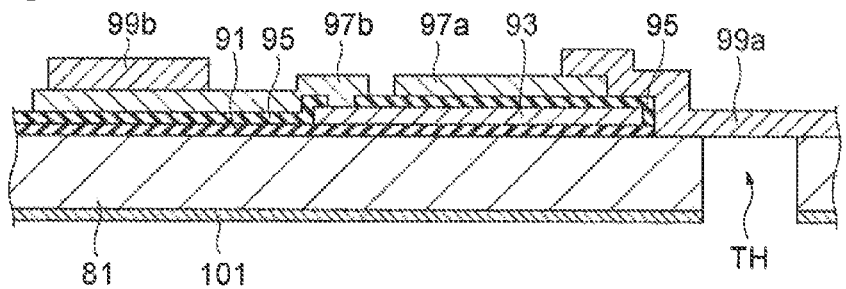
Figure 13C:
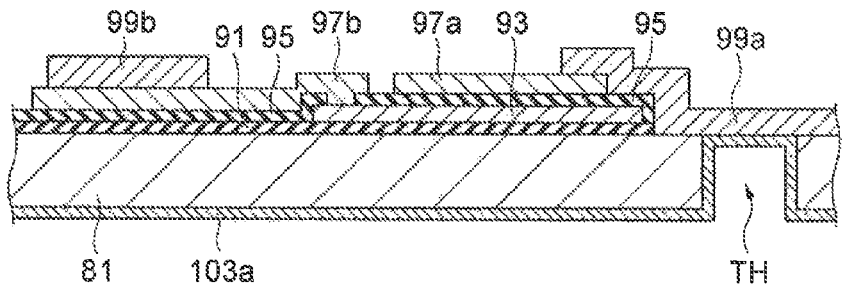
Figure 13D:
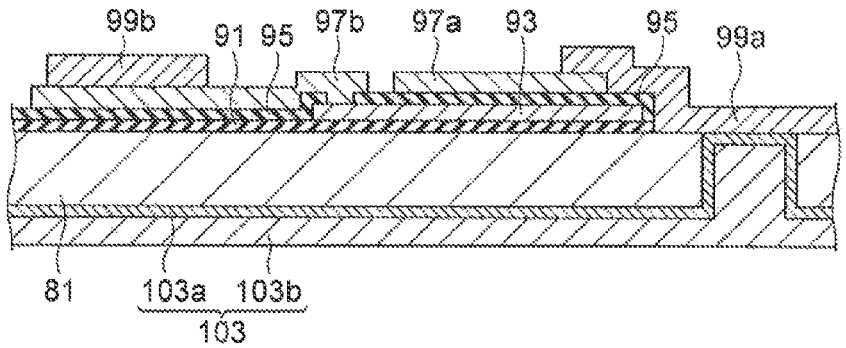

Subsequently, a step of forming the through-via in the semi-insulating InP wafer 81 will be described. FIGS. 13A to 13D show cross-sections in a series of steps for forming a through-via electrically connected to the capacitor. In order to easily understand steps carried out after the steps described in FIGS. 12A to 12E, FIGS. 13A to 13D show a cross-section corresponding to the cross-section shown in FIGS. 12A to 12E. As shown in FIGS. 13A to 13D, the through-via is disposed in a via region of the semi-insulating InP wafer 81. This via region is preferably disposed along the edge of integrated optical semiconductor device. Consequently, it is possible to avoid complication of the shapes and structures of the first conductive layer and the second conductive layer that are formed from the back surface conductive layer as described later. In addition, reduction in the area of the second conductive layer 23 is facilitated. As shown in FIGS. 12D and 12E and FIG. 13A, the insulating layer 91 and another insulating layer 95 on the area in the via region are removed so that the surface of the semi-insulating InP wafer is exposed, and the via region is covered with a gold plating 99a constituting a wiring conductor. A through-hole TH to form the through-via is formed in the via region covered with the wiring conductor containing the gold plating layer 99a. A mask 101 having an opening in the via region of the back surface of the semi-insulating InP wafer 81 is produced by photolithography. As shown in FIG. 13B, the semi-insulating InP wafer 81 is etched from the back surface of the semi-insulating InP wafer 81 by using the mask 101 as an etching mask. After the etching, the through-hole TH reaches the wiring conductor (gold plating 99a) on the principal surface from the back surface of the semi-insulating InP wafer 81, and the wiring conductor is exposed through the through-hole TH. After the formation of the through-hole TH, the mask 101 is removed. As shown in FIG. 13C, a seed layer 103a is formed on the back surface of the semi-insulating InP wafer 81 and a side surface of the through-hole TH. In addition, the seed layer 103a is formed at a bottom of the through-hole TH in contact with a bottom surface of the wiring conductor (gold plating 99a). The seed layer 103a is made of, for example, a platinum layer and a gold layer disposed on the platinum layer. The platinum layer and the gold layer are made by using a sputtering method, for example. As shown in FIG. 13D, a gold plating layer 103b is formed on the seed layer 103a. Especially, the gold plating layer 103b is formed in the through-hole TH so as to fill the through-hole TH with the conductive material. In addition, a back surface conductive layer 103 including the seed layer 103a and the gold plating layer 103b is formed on the back surface of the semi-insulating InP wafer 81. The back surface conductive layer 103 is electrically connected to the wiring conductor (gold plating 99a) through the conductive material in the through-hole TH.

Figure 14A:
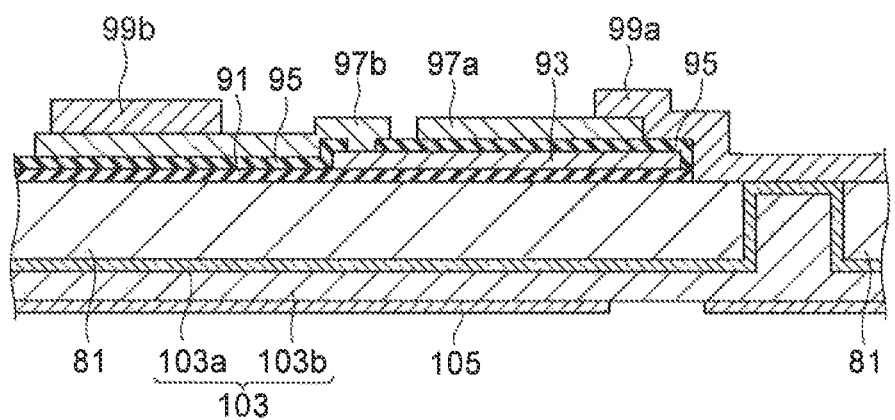
FIGS. 14A and 14B are drawings schematically showing main steps in a method for producing an integrated optical semiconductor device.
Figure 14B:
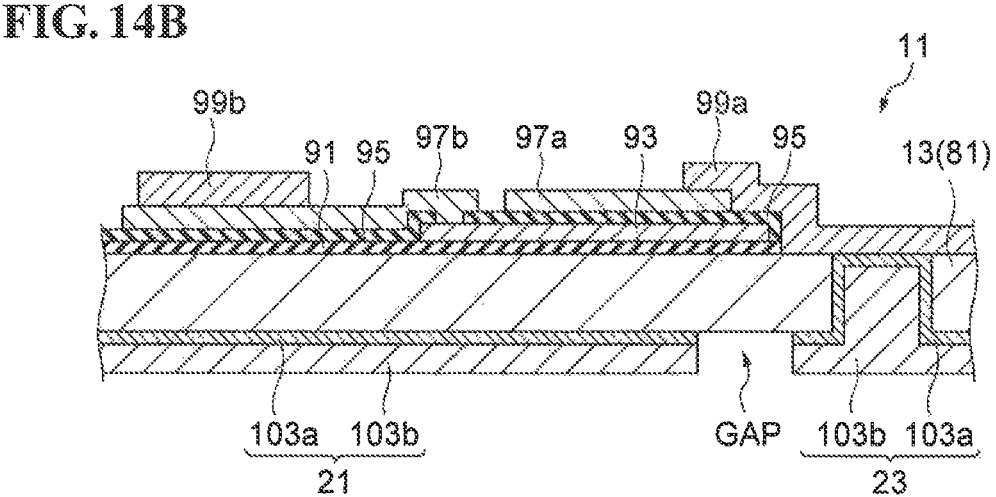

FIGS. 14A and 14B show cross-sections in a series of steps for forming an isolation groove in the back surface conductive layer. In order to understand steps carried out after the steps described in FIGS. 13A to 13D, FIGS. 14A and 14B show a cross-section corresponding to the cross-section shown in FIGS. 13A to 13D. In order to isolate the first conductive layer 21 from the second conductive layer 23, as shown in FIG. 14A, a mask 105 is formed on the back surface conductive layer 103. As shown in FIG. 14B, the back surface conductive layer 103 is etched by using this mask 105 to form the first conductive layer 21 and the second conductive layer 23. By this etching, a groove making a gap GAP is formed between the first conductive layer 21 and the second conductive layer 23. The first conductive layer 21 is placed in isolation from the second conductive layer 23 by the gap GAP. The back surface of the semi-insulating InP wafer 81 is exposed through the groove. The first conductive layer 21 is formed in the first region of the semi-insulating InP wafer 81. The second conductive layer 23 is formed in the second region of the semi-insulating InP wafer 81. A substrate product to form the integrated optical semiconductor device 11 is formed by these steps. The resulting substrate product is divided into a chip, so that the semiconductor integrated optical semiconductor device 11 is formed from the substrate product. In the semiconductor integrated optical semiconductor device 11, the first conductive layer 21 is formed on the second surface 13d in the first region 13a of the semi-insulating semiconductor substrate 13. The second conductive layer 23 is formed on the second surface 13d in the second region 13b of the semi-insulating semiconductor substrate 13.

Figure 15A:
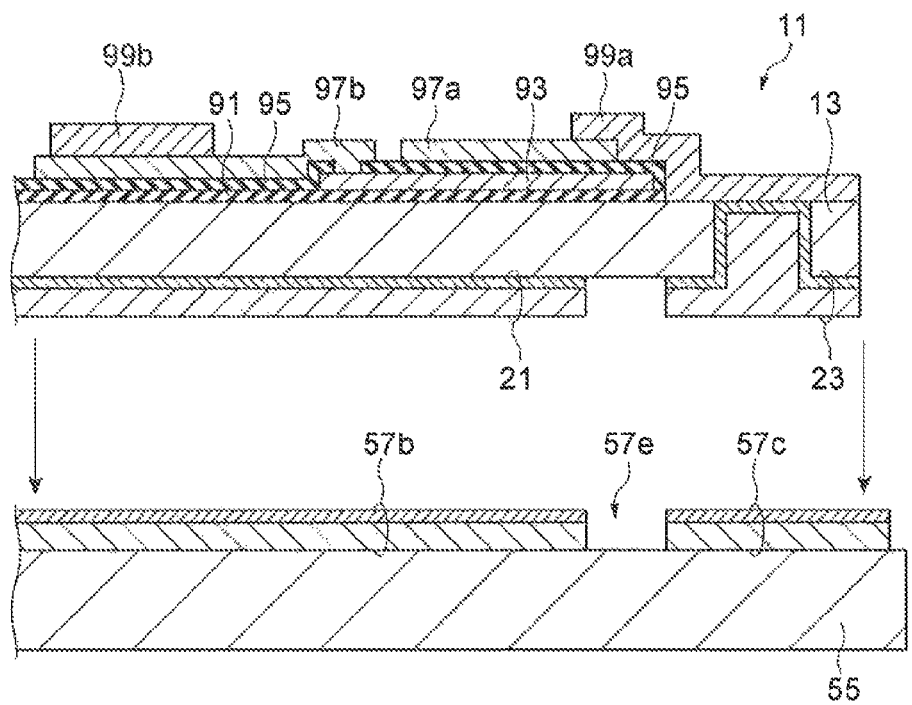
FIGS. 15A and 15B are drawings schematically showing main steps in a method for producing an integrated optical semiconductor device.
Figure 15B:
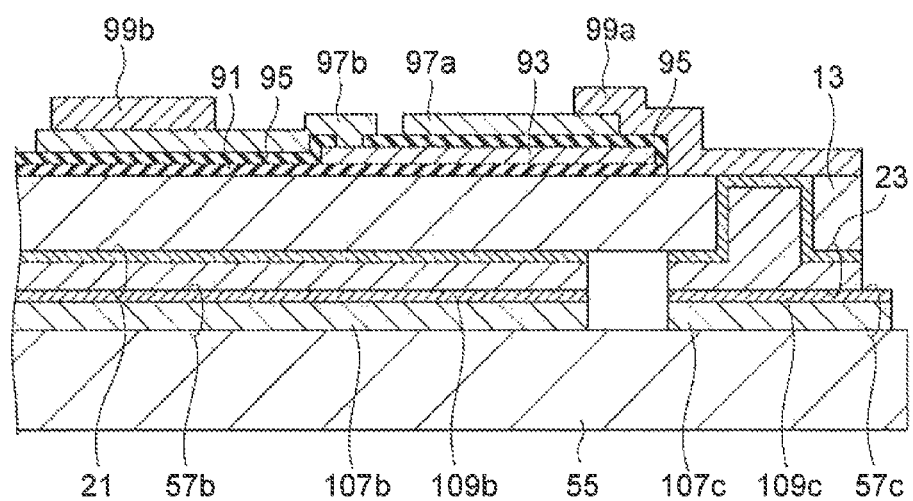

As shown in FIGS. 15A and 15B, the integrated optical semiconductor device 11 is mounted on the principal surface of the circuit board 55. Referring to FIG. 15A, the integrated optical semiconductor device 11 and the circuit board 55 are prepared. The electrode layer 57b and the electrode layer 57c are disposed on the principal surface 55a of the circuit board 55. The electrode layer 57b and the electrode layer 57c are electrically insulated from each other by a gap 57e disposed between the electrode layer 57b and the electrode layer 57c. In the embodiment, in the gap, a groove is formed between the electrode layer 57b and the electrode layer 57c. The electrode layer 57b includes a metal layer 107b disposed on the principal surface 55a, of the circuit board 55 and a solder 109b disposed on the metal layer 107b. The electrode layer 57c includes a metal layer 107c disposed on the principal surface 55a of the circuit board 55 and a solder 109c disposed on the metal layer 107c. The first conductive layer 21 of the integrated optical semiconductor device 11 is arranged in contact with the electrode layer 57b of the circuit board 55. The second conductive layer 23 of the integrated optical semiconductor device 11 is arranged in contact with the electrode layer 57c of the circuit board 55. The first conductive layer 21 of the integrated optical semiconductor device 11 is electrically connected to the metal layer 107b of the circuit board 55 by using the solder 109b. The second conductive layer 23 of the integrated optical semiconductor device 11 is electrically connected to the metal layer 107c of the circuit board 55 by using the solder 109c. The metal layer 107c of the circuit board 55 is connected to ground level. A ground potential is supplied to the metal layer 107c of the electrode layer 57c. On the other hand, the metal layer 107b of the circuit board 55 is not connected to the ground level, and the electrode layer 57b is electrically floating. After the integrated optical semiconductor device 11 is mounted on the circuit board 55 by using above configuration, the first conductive layer 21 is electrically isolated from the second conductive layer 23.

Fabrication process for the isolation of the back surface conductive layer 103 will be described below. The gold layer of the seed layer 103a and the gold plating layer 103b are wet-etched by using, for example, iodine based etchant. By this etching, the resistance between the isolated two conductive layers is about several ohms. After etching the gold layer of the seed layer 103a and the gold plating layer 103b, the platinum layer of the seed layer 103a and the alloy layer made of platinum and InP are removed by an ion milling method (for example, argon (Ar) ion milling method). A groove having a depth of for example, about 0.1 μm is formed in the back surface of the semi-insulating InP wafer 81 by this ion milling. After this step, the resistance between the isolated two conductive layers is increased up to about several hundred ohms. After the ion milling, a damaged layer generated by the ion milling is removed by wet-etching the semi-insulating InP wafer 81 exposed at the bottom surface of the groove by using a hydrochloric acid based aqueous solution. The back surface of the semi-insulating InP wafer 81 is exposed through the groove by the above-described ion milling and wet etching. After this step, the resistance between the isolated two conductive layers that are the first conductive layer 21 and the second conductive layer 23 becomes about several hundred megohms.

The depth of the groove formed in the back surface of the semi-insulating InP wafer 81 is, for example, 0.2 μm or more. Consequently, a damage layer is substantially removed. The groove reaches some midpoint of the semi-insulating InP wafer 81. Meanwhile, the depth of the groove is, for example, 1 μm or less. The width of the groove formed in the back surface of the semi-insulating InP wafer 81 is, for example, about 100 to 500 μm. Consequently, a short circuit due to jointing of the solder each other or jointing of the solder to each of the first conductive layer and the second conductive layer is avoided while sufficiently high resistance between the isolated two conductive layers is maintained. The solder is made of for example, AuSn and is used in mounting the integrated optical semiconductor device 11 on the circuit board 55. In this isolation groove, a damage layer generated in the ion milling process used for the isolation of the conductive layers is substantially removed. The separation resistance between the first conductive layer 21 and the second conductive layer 23 is 100 megohm or more because of removal of the damage layer.

Figure 16:
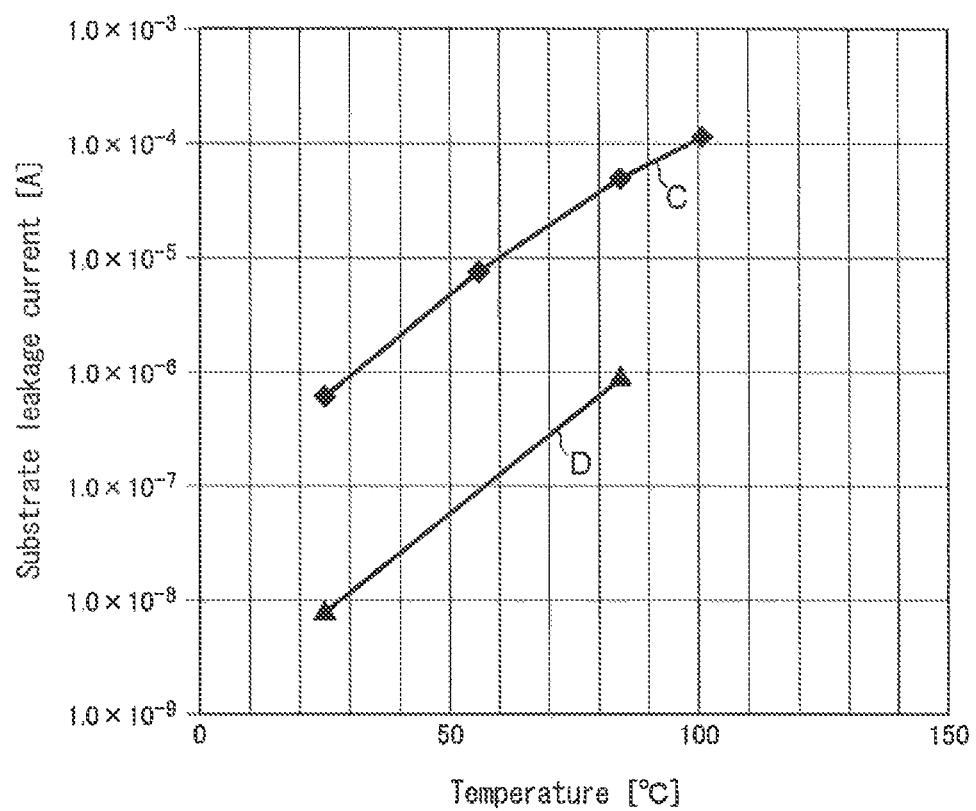
FIG. 16 is a drawing showing the temperature dependence of a substrate leakage current measured with a device having a back surface conductive layer with isolation and that measured with a device having a back surface conductive layer without isolation.

The resistivity of the semi-insulating InP substrate (wafer) is, for example, $1 \times 10^7$ Ωcm. The thickness of the semi-insulating InP substrate is, for example, 100 μm. As mentioned above, when the n-type InP layer (n-type semiconductor layer 31) is disposed on the entire first surface 13c in the first region 13a and the second region 13b of the semi-insulating semiconductor substrate 13, the distance of the core layer 35 of the output optical waveguides 15a to 15d from the principal surface of the semi-insulating semiconductor substrate 13 is easily adjusted to the distance of the light receiving layer 43 from the principal surface of the semi-insulating semiconductor substrate 13. As a result, it becomes easy to form the butt-joint structures having a low optical coupling loss between the output optical waveguides 15a to 15d of the multimode interference coupler 15 and the light receiving device 17. In addition, the thickness of the core layer 35 of the output optical waveguides 15a to 15d is easily adjusted to a designed thickness with high accuracy. As a result, the output optical waveguides 15a to 15d are optically coupled to the light receiving device 17 with high optical coupling efficiency and low optical coupling loss. However, the substrate leakage current flows from the n-type semiconductor layer 31 toward the conductive layers (the first and second conductive layers 21 and 23) through the semi-insulating semiconductor substrate 13, when the first and second conductive layers 21 and 23 are electrically connected. Specifically, the n-type InP layer (n-type semiconductor layer 31) on the principal surface of the semi-insulating InP substrate has a large area of about 5 mm². The back surface conductive layer is disposed on the back surface of the semi-insulating InP substrate. The semi-insulating InP substrate has a relatively large resistance of about 2 megohm. For the integrated optical semiconductor device having a single back surface conductive layer formed on the entire back surface of the semi-insulating InP substrate, a small amount of substrate leakage current flows because the n-type InP layer and the back surface conductive layer have large areas, even when the semi-insulating InP substrate has such a large resistance. For example, the substrate leakage current of about 1.5 μA flows between the n-type InP layer and the back surface conductive layer through the semi-insulating InP substrate at the time of applying a voltage of 3 volts to the cathode electrode of the photodiode of the integrated optical semiconductor device. This value of the substrate leakage current is larger than or equal to the dark current of the photodiode. Therefore, this substrate leakage current influences the characteristics of the photodiode. FIG. 16 shows the temperature dependence of a substrate leakage current measured with a device having a back surface conductive layer with isolation groove (curve D) and that measured with a device having a back surface conductive layer without isolation groove (curve C) when a voltage of 3 volts is applied to the cathode electrode of the photodiode. In FIG. 16, for the device having the back surface conductive layer with isolation groove (curve D), the substrate leakage current is reduced by about two orders of magnitude compared to that for the device having the back surface conductive layer without isolation groove (curve C) because the second conductive layer 23 is electrically separated from the first conductive layer 21. In addition, the second conductive layer 23 has a smaller area than that of the first conductive layer 21.

Principles of the present invention have been described on the basis of preferred embodiments with reference to the drawings. However, those skilled in the art will understand that the present invention can be changed in terms of arrangement and details without departing from such principles. The present invention is not limited to the specific configurations disclosed in the embodiments. Therefore, rights related to all modifications and changes within the scope and the spirit of the claims are claimed.

What is claimed is:

1. An integrated optical semiconductor device comprising:
    a substrate having a principal surface and a back surface opposite to the principal surface, the substrate including a first region and a second region arranged in a first axis direction;
    a plurality of light receiving devices disposed on the principal surface in the second region of the substrate, each light receiving device including a low cladding layer including are n-type semiconductor layer and a light receiving layer disposed on the low cladding layer;
    a multimode interference coupler disposed on the principal surface in the first region of the substrate, the multimode interference coupler including a first cladding layer and a core layer disposed on the first cladding layer, the multimode interference coupler including output optical waveguides that are optically coupled to corresponding light receiving devices;
    a first conductive layer disposed on the back surface in the first region of the substrate;
    a second conductive layer disposed on the back surface in the second region of the substrate, the second conductive layer being electrically insulated from the first conductive layer by a gap between the first and second conductive layers; and
    a plurality of capacitors disposed on the principal surface in the second region of the substrate, each of the capacitors including a first electrode electrically connected to one of the light receiving devices and a second electrode electrically connected to the second conductive layer,
    wherein the substrate is made of a semi-insulating semiconductor material, and
    the first cladding layer of the multimode interference coupler includes the n-type semiconductor layer of the light receiving devices.

2. The integrated optical semiconductor device according to claim 1,
wherein the first conductive layer and the second conductive layer each include a seed conductive layer disposed on the back surface of the substrate and a gold plating layer disposed on the seed conductive layer.

3. The integrated optical semiconductor device according to claim 2,
wherein the seed conductive layer includes a platinum layer disposed on the back surface of the substrate and a gold layer disposed on the platinum layer.

4. The integrated optical semiconductor device according to claim 1,
wherein a plurality of through-holes disposed in the second region of the substrate, each through-hole including a conductive material therein, and
wherein each of the second electrodes of the capacitors is electrically connected to the second conductive layer through the conductive material of at least one of the through-holes.

5. The integrated optical semiconductor device according to claim 4,
wherein the first conductive layer and the second conductive layer each include a seed conductive layer disposed on the hack surface of the substrate and a gold plating layer disposed on the seed conductive layer,
the seed conductive layer of the second conductive layer is further disposed on a side surface of each through-hole,
each through-hole is filled with the gold plating layer, and
the conductive material is composed of the seed conductive layer and the gold plating layer.

6. The integrated optical semiconductor device according to claim 1, wherein the plurality of light receiving devices is arranged along a direction intersecting the first axis direction, and
the capacitors having the first electrodes connected to the corresponding light receiving devices are arranged along the direction intersecting the first axis direction.

7. The integrated optical semiconductor device according to claim 1, wherein a groove makes the gap between the first and second conductive layers, and
the groove has a bottom reaching a midpoint of the substrate.

8. The integrated optical semiconductor device according to claim 1, wherein each of the output optical waveguides of the multimode interference coupler is connected in contact with the corresponding light receiving device at a butt-jointed portion on boundary between the output optical waveguide and the light receiving device.

9. The integrated optical semiconductor device according to claim 1, wherein the n-type semiconductor layer included in the multimode interference coupler is disposed on the entire principal surface in the first region of the substrate, and
the substrate is disposed between the n-type semiconductor layer and the first conductive layer in the first region.

10. An integrated optical semiconductor device assembly comprising:
an integrated optical semiconductor device; and
a circuit board on which the integrated optical semiconductor device is mounted, the circuit board having a first electrode layer and a second electrode layer electrically insulated from the first electrode layer,
wherein the integrated optical semiconductor device includes:
a substrate having a principal surface and a back surface opposite to the principal surface, the substrate including a first region and a second region arranged in a first axis direction;
a plurality of light receiving devices disposed on the principal surface in the second region of the substrate, each light receiving device including a low cladding layer including an n-type semiconductor layer and a light receiving layer disposed on the low cladding layer;
a multimode interference coupler disposed on the principal surface in the first region of the substrate, the multimode interference coupler including a first cladding layer and a core layer disposed on the first cladding layer, the multimode interference coupler including output optical waveguides that are optically coupled to corresponding light receiving devices;
a first conductive layer disposed on the back surface in the first region of the substrate;
a second conductive layer disposed on the back surface in the second region of the substrate, the second conductive layer being electrically insulated from the first conductive layer by a gap between the first and second conductive layers; and
a plurality of capacitors disposed on the principal surface in the second region of the substrate, each of the capacitors including a first electrode electrically connected to one of the light receiving devices and a second electrode electrically connected to the second conductive layer, and wherein
the substrate is made of a semi-insulating semiconductor material,
the first cladding layer of the multimode interference coupler includes the n-type semiconductor layer of the light receiving devices,
the first conductive layer of the integrated optical semiconductor device is mounted in contact with the first electrode layer of the circuit board,
the second conductive layer of the integrated optical semiconductor device is mounted in contact with the second electrode layer of the circuit board,
the second electrode layer of the circuit board is connected to ground level, and
the first electrode layer is electrically floating.

* * * * *